(12) United States Patent
Hu

(10) Patent No.: US 12,243,278 B2
(45) Date of Patent: Mar. 4, 2025

(54) DATA PROCESSING METHOD AND APPARATUS FOR IMMERSIVE MEDIA, DEVICE AND STORAGE MEDIUM

(71) Applicant: TENCENT TECHNOLOGY (SHENZHEN) COMPANY LIMITED, Guangdong (CN)

(72) Inventor: Ying Hu, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 115 days.

(21) Appl. No.: 18/351,899

(22) Filed: Jul. 13, 2023

(65) Prior Publication Data
US 2023/0360277 A1    Nov. 9, 2023

Related U.S. Application Data

(63) Continuation of application No. PCT/CN2022/135538, filed on Nov. 30, 2022.

(30) Foreign Application Priority Data

Mar. 8, 2022   (CN) .......................... 202210227641.5

(51) Int. Cl.
*G06T 9/00*         (2006.01)
(52) U.S. Cl.
CPC .................................. *G06T 9/001* (2013.01)
(58) Field of Classification Search
None
See application file for complete search history.

(56) References Cited

U.S. PATENT DOCUMENTS

| | | | |
|---|---|---|---|
| 11,595,670 B2 * | 2/2023 | Aksu | ...................... H04N 19/70 |
| 2021/0211674 A1 | 7/2021 | Lim | |
| 2021/0407144 A1 | 12/2021 | Ramasubramonian et al. | |
| 2022/0292543 A1 * | 9/2022 | Henderson | ......... G06Q 30/0252 |

FOREIGN PATENT DOCUMENTS

| | | |
|---|---|---|
| CN | 110796589 A | 2/2020 |
| CN | 111263237 A | 6/2020 |
| CN | 111479114 A | 7/2020 |
| CN | 112019857 A | 12/2020 |
| CN | 114095737 A | 2/2022 |
| WO | WO-2021176133 A1 * | 9/2021 |

OTHER PUBLICATIONS

International Search Report for PCT/CN2022/135538 dated Feb. 20, 2023.
Written Opinion for PCT/CN2022/135538 dated Feb. 20, 2023.

* cited by examiner

*Primary Examiner* — Tyler W. Sullivan
(74) *Attorney, Agent, or Firm* — Sughrue Mion, PLLC

(57) ABSTRACT

A data processing method for immersive media including acquiring point cloud data, encoding the point cloud data to obtain a point cloud code stream and a header information set, determining reuse indication information of the point cloud code stream based on a reuse state of the header information set, generating decoder configuration record information for the point cloud code stream according to the reuse state, and encapsulating the point cloud code stream and the decoder configuration record information as a media file of the immersive media.

20 Claims, 8 Drawing Sheets

DATA PROCESSING METHOD AND APPARATUS FOR IMMERSIVE MEDIA, DEVICE AND STORAGE MEDIUM

CROSS REFERENCE TO RELATED APPLICATIONS

This application is a continuation application of International Patent Application No. PCT/CN2022/135538 filed Nov. 30, 2022, which claims priority to Chinese Patent Application No. 2022102276415, filed with the Chinese Patent Office on Mar. 8, 2022 which are incorporated by reference herein in their entireties.

FIELD

The disclosure relates to the technical field of computers, and in particular, to a data processing method and apparatus for immersive media, a device and a storage medium.

BACKGROUND

Immersive media refers to media content that may bring immersive experience to a service object. Point cloud media is a typical immersive media. In a conventional technology, each point cloud frame in a point cloud code stream corresponding to the point cloud media contains corresponding header information. Therefore, every decoding of the point cloud frame requires decoding the header information contained therein. When the same header information exists in the different point cloud frames, it will inevitably lead to repeated decoding of the same header information, resulting in a waste of decoding resources.

SUMMARY

Various embodiments provide a data processing method and apparatus for immersive media, a device and a storage medium.

According to an aspect of one or more embodiments, there is provided a data processing method for immersive media, executed by a content production device, the data processing method comprising acquiring point cloud data; encoding the point cloud data to obtain a point cloud code stream and a header information set; determining reuse indication information of the point cloud code stream based on a reuse state of the header information set; generating decoder configuration record information for the point cloud code stream according to the reuse state; and encapsulating the point cloud code stream and the decoder configuration record information as a media file of the immersive media.

According to other aspects of one or more embodiments, there is also provided a data processing apparatus, a computer device, and a non-transitory computer readable storage medium consistent with the method.

BRIEF DESCRIPTION OF THE DRAWINGS

To describe technical solutions in embodiments more clearly, the following briefly introduces accompanying drawings for describing some embodiments. The accompanying drawings in the following description show only some embodiments, and those ordinarily skilled in the art may still derive other accompanying drawings from these accompanying drawings without creative efforts.

DETAILED DESCRIPTION

Figure 1A:
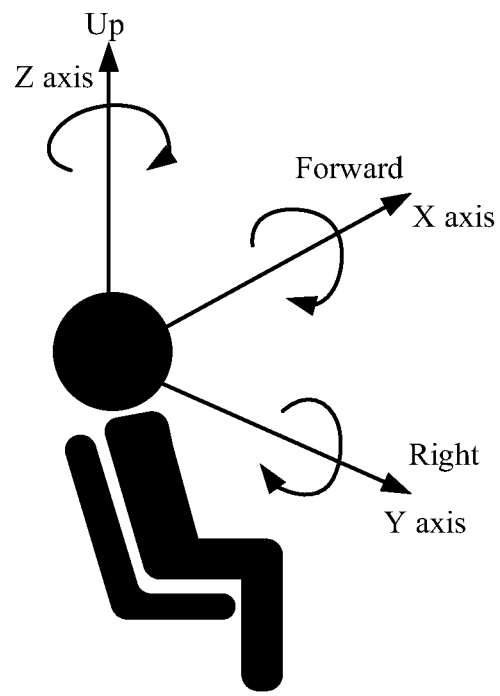
FIG. 1a is a schematic diagram of 3DoF provided by some embodiments.

In order to make objects, technical solutions, and advantages of the disclosure more obvious, certain embodiments according to the disclosure are described in detail below with reference to the drawings. The described embodiments are not to be construed as a limitation to the present disclosure. All other embodiments obtained by a person of ordinary skill in the art without creative efforts shall fall within the protection scope of the present disclosure and accompanying claims.

In the following descriptions, related "some embodiments" describe a subset of all possible embodiments. However, it may be understood that the "some embodiments" may be the same subset or different subsets of all the possible embodiments, and may be combined with each other without conflict.

"Plurality of", as mentioned in the specification means two or more. "And/or" describes an association relationship for describing associated objects and represents that three relationships may exist. For example, A/B may represent the following cases: Only A exists, both A and B exist, and only B exists. Similarly, the phrase "at least one of A and B" includes within its scope "only A", "only B" and "A and B". The character "/" in this specification generally indicates an "or" relationship between the associated objects unless otherwise noted or the context suggests otherwise.

Some technical terms involved in some embodiments are introduced below.

I. Immersive media:

Immersive media (also known as immersive type media) refers to a media file that can provide immersive type media content so that a service object immersed in the media content can obtain visual, auditory and other sensory experiences in the real world. The immersive media may be divided into 3DoF media, 3DoF+ media and 6DoF media according to a degree of freedom (DoF) of the service object when consuming the media content. Point cloud media is a typical type of 6DoF media. In some embodiments, users (i.e. viewers) who consume the immersive type media (such as the point cloud media) may be collectively referred to as the service object.

II. Point cloud:

The point cloud is a set of randomly distributed discrete point sets in space that represent a spatial structure and surface attributes of a 3-dimension object or scenario. Each point in the point cloud has at least 3-dimension location information, and may further have color, material, or other information according to different application scenarios. Usually, each point in the point cloud has the same number of additional attributes.

The point cloud may flexibly and conveniently express the spatial structure and surface attributes of the three-dimensional object or scenario, and thus has wide applications, including virtual reality (VR) games, computer aided design (CAD), a geography information system (GIS), an autonomous navigation system (ANS), digital cultural heritage, free view broadcasting, 3-dimension immersive telepresence, 3-dimension reconstruction of biological tissues and organs, etc.

The main ways to acquire the point cloud are as follows: computer generation, 3-dimension (3D) laser scanning, 3D photogrammetry, etc. A computer may generate a point cloud of a virtual 3-dimension object and scenario. 3D scanning may obtain a point cloud of the 3-dimension object or scenario in a static real world, and may acquire point clouds of millions per second. 3D photography may obtain a point cloud of the 3-dimension object or scenario in a dynamic real world, and may acquire point clouds of tens of millions per second. In addition, in a medical field, a point cloud of the biological tissues and organs may be obtained through magnetic resonance imaging (MRI), computed tomography (CT), and electromagnetic localization information. These technologies reduce cost and time cycle for acquiring point cloud data, and improve precision of the data. Transformation of a point cloud data acquiring mode makes it possible to acquire a large amount of point cloud data. With continuous accumulation of large-scale point cloud data, efficient storage, transmission, publication, sharing and standardization of the point cloud data become the key to point cloud applications.

III. Track:

The track is a set of media data in an encapsulation process of the media file. One media file may be composed of one or more tracks, for example, commonly: one media file may contain a video track, an audio track, and a subtitle track.

IV. Sample:

The sample is an encapsulation unit in the encapsulation process of the media file, and one track is composed of many samples, for example: one video track may be composed of many samples, and one sample is typically one video frame. In some embodiments, one sample may be one point cloud frame.

V. Degree of freedom (DoF):

In the disclosure, DoF refers to the degree of freedom of the service object to support movement and generate content interaction when watching the immersive media (such as the point cloud media), and may include three degrees of freedom (3DoF), 3DoF+ and six degrees of freedom (6DoF). 3DoF refers to the three types of degrees of freedom that a head of the service object rotates around an x axis, a y axis, and a z axis. 3DoF+ refers to that based on the three degrees of freedom, the service object further has the degrees of freedom of finite movement along the x axis, the y axis, and the z axis. 6DoF refers to that based on the three degrees of freedom, the service object further has the degrees of freedom of free movement along the x axis, the y axis, and the z axis.

VI. An international standard organization (ISO) based media file format (ISOBMFF): It is an encapsulation standard for the media file, and a typical ISOBMFF file is a moving picture experts group 4 (MP4) file.

VII. Dynamic adaptive streaming over HTTP (DASH): It is an adaptive bit rate technology that enables high-quality streaming media to be transmitted over the Internet through a conventional HTTP network server.

VIII. Media presentation description (MPD) in DASH is used for describing media segment information in the media file.

IX. Representation: It refers to a combination of one or more media components in DASH, for example, a video file with a certain resolution may be considered as one representation.

X. Adaptation sets: It refers to a set of one or more video streams in DASH, and one adaptation set may contain the plurality of representations.

XI. Media segment: It is a segment that conforms to a certain media format and may be played. During playback, it may be necessary to cooperate with its previous 0 or more segments and an initialization segment.

Various embodiments provide a data processing method and apparatus for immersive media, a device and a storage medium.

An aspect of some embodiments provides a data processing method for immersive media, executed by a content production device, and including:

acquiring point cloud data and encoding the point cloud data to obtain a point cloud code stream containing reuse indication information, the reuse indication information being determined based on a reuse state of a header information set, and the header information set being generated in a process of encoding the point cloud data;

generating decoder configuration record information for the point cloud code stream according to the reuse state; and encapsulating the point cloud code stream and the decoder configuration record information as a media file of the immersive media, the reuse indication information and the decoder configuration record information being used for providing the header information set for decoding and the reuse state of the header information set for the point cloud code stream in the media file.

Another aspect of some embodiments provides a data processing method for immersive media, including:

acquiring a media file of the immersive media, and de-encapsulating the media file to obtain a point cloud code stream in the media file and decoder configuration record information associated with the point cloud code stream, the decoder configuration record information being generated according to a reuse state of a header information set, the header information set being generated in a process of encoding point cloud data, the point cloud code stream containing reuse indication information, and the reuse indication information being determined based on the reuse state, and the reuse indication information and the decoder configuration record information being used for providing the header information set for decoding and the reuse state of the header information set for the point cloud code stream; and decoding the point cloud code stream based on the decoder configuration record information.

Yet another aspect of one or more embodiments provides a data processing apparatus for immersive media, including:

an encoding module, configured to acquire point cloud data and encode the point cloud data to obtain a point cloud code stream containing reuse indication information, the reuse indication information being determined based on a reuse state of a header information set, and the header information set being generated in a process of encoding the point cloud data;

a generating module, configured to generate decoder configuration record information for the point cloud code stream according to the reuse state; and an encapsulating module, configured to encapsulate the point cloud code stream and the decoder configuration record information as a media file of the immersive media, the reuse indication information and the decoder configuration record information being used for providing the header information set for decoding and the reuse state of the header information set for the point cloud code stream in the media file.

Yet another aspect of one or more embodiments provides a data processing apparatus for immersive media, including:

a de-encapsulating module, configured to acquire a media file of the immersive media, and de-encapsulate the media file to obtain a point cloud code stream in the media file and decoder configuration record information associated with the point cloud code stream, the decoder configuration record information being generated according to a reuse state of a header information set, the header information set being generated in a process of encoding point cloud data, the point cloud code stream containing reuse indication information, and the reuse indication information being determined based on the reuse state, and the reuse indication information and the decoder configuration record information being used for providing the header information set for decoding and the reuse state of the header information set for the point cloud code stream; and a decoding module, configured to decode the point cloud code stream based on the decoder configuration record information.

Yet another aspect of one or more embodiments provides a computer device, including: one or more processors and memories, the processor being connected with the memory, the memory being configured to store a computer readable instruction, and the computer readable instruction, when executed by the processor, causing the computer device to execute the method provided by some embodiments.

Yet another aspect of one or more embodiments provides one or more computer readable storage mediums, the computer readable storage medium stores a computer readable instruction, and the computer readable instruction is suitable for being loaded and executed by a processor, such that a computer device having the processor executes the method provided by some embodiments.

Yet another aspect of one or more embodiments provides a computer program product, the computer program product includes a computer readable instruction, and the computer readable instruction is stored in one or more computer readable storage mediums. One or more processors of the computer device read the computer readable instruction from the computer readable storage medium, and the processor executes the computer readable instruction, such that the computer device executes the method provided by some embodiments.

Details of the various are provided in the accompanying drawings and descriptions below. Other features, objectives, and advantages of this application will become apparent from the specification, the drawings, and the claims.

Various embodiments are directed to a data processing technology for immersive media. Some concepts in a data processing process of the immersive media will be introduced below. Particularly, illustration is made in subsequent embodiments by taking the immersive media as point cloud media as an example.

FIG. 1a is a schematic diagram of 3DoF provided by some embodiments. As shown in FIG. 1a, 3DoF means that a service object consuming the immersive media is fixed at a center point of a 3-dimension space, and a head of the service object rotates along an X axis, a Y axis, and a Z axis to view a picture provided by media content.

Figure 1B:
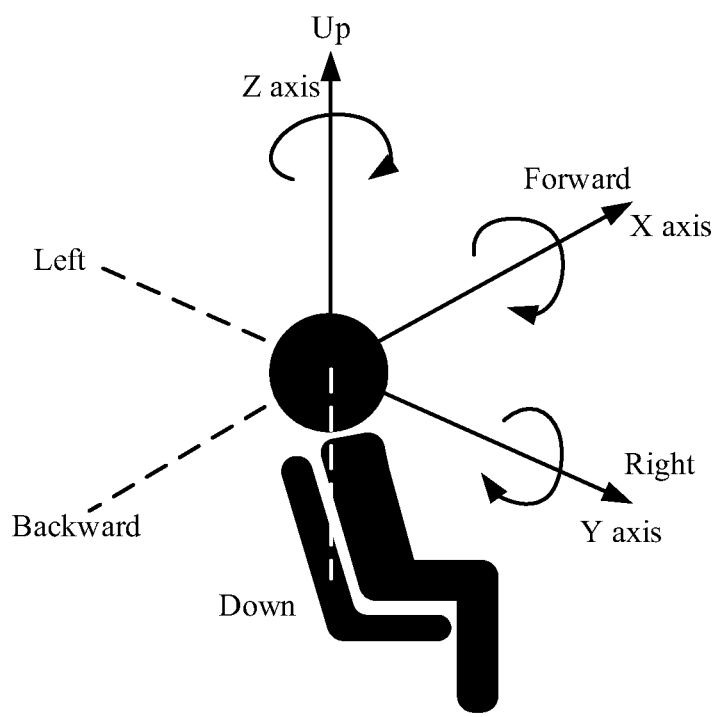
FIG. 1B is a schematic diagram of 3DoF+ provided by some embodiments.

FIG. 1B is a schematic diagram of 3DoF+ provided by some embodiments. As shown in FIG. 1B, 3DoF+ means that when a virtual scenario provided by the immersive media has certain depth information, the head of the service object head may view the picture provided by the media content by moving in a limited space based on 3DoF.

Figure 1C:
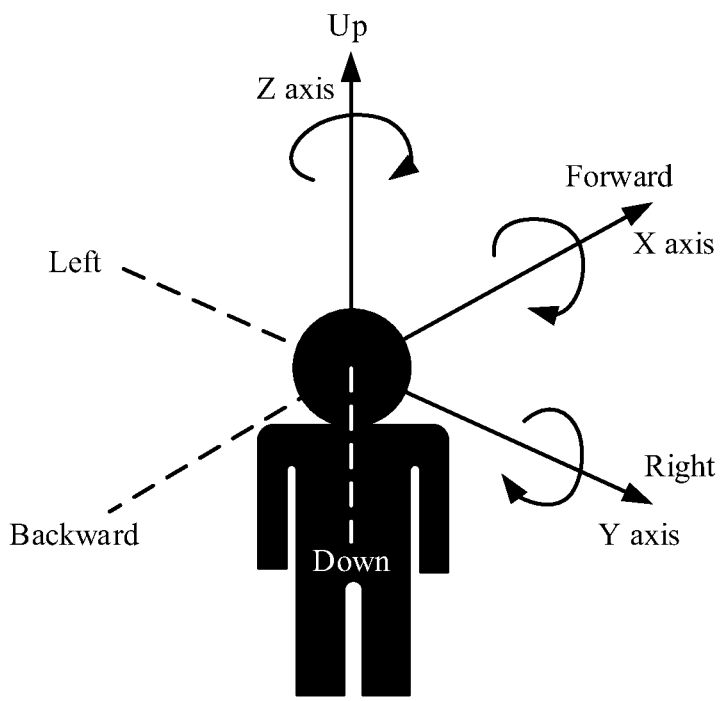
FIG. 1c is a schematic diagram of 6DoF provided by some embodiments.

FIG. 1c is a schematic diagram of 6DoF provided by some embodiments. As shown in FIG. 1c, 6DoF is divided into window 6DoF, omnidirectional 6DoF and 6DoF, where window 6DoF refers to the restricted rotation movement of the service object in the X axis and the Y axis, and the restricted translation in the Z axis. For example, the service object cannot see the scene outside a window frame, and the service object cannot pass through the window. The omnidirectional 6DoF refers to the restricted rotation movement of the service object in the X axis, the Y axis and the Z axis. For example, the service object cannot freely pass through 3-dimension 360-degree VR content in a restricted movement region. 6DoF means that the service object may be subjected to translation freely along the X axis, the Y axis and the Z axis on the basis of 3DoF. For example, the service object may walk freely in the 3-dimension 360-degree VR content.

Figure 2:
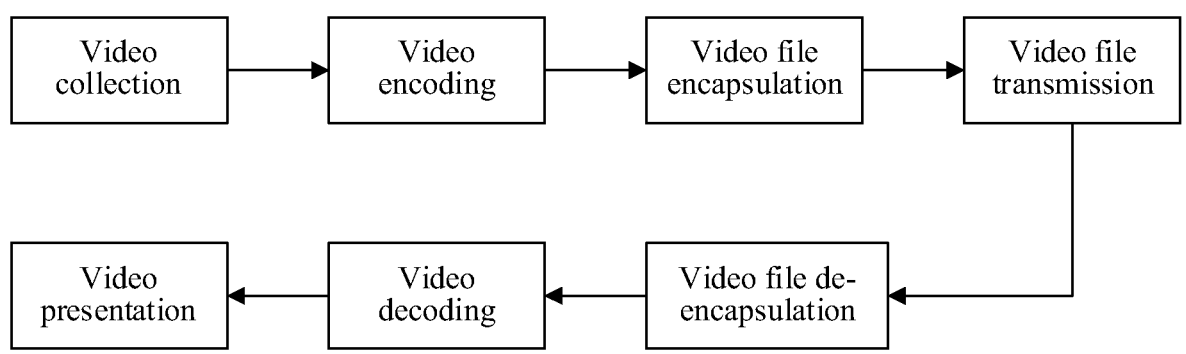
FIG. 2 is a schematic flowchart of immersive media from collection to being consumed provided by some embodiments.

FIG. 2 is a schematic flowchart of the immersive media from collection to being consumed provided by some embodiments. As shown in FIG. 2, a complete processing process for the immersive media may specifically include: video collection, video encoding, video file encapsulation, video file transmission, video file de-encapsulation, video decoding, and final video presentation.

Video collection is used for converting an analog video into a digital video and saving it in a format of a digital video file. In other words, video collection may convert video signals (such as point cloud data) collected by a plurality of cameras from different angles into binary digital information. The binary digital information converted from the video signals is a binary data stream, and the binary digital information may also be referred to as a code stream or a bitstream of the video signals. Video encoding refers to converting a file in an original video format into another video format file through a compression technology. From the perspective of an acquiring mode of the video signals, the video signals may be divided into video signals captured by the camera and generated by a computer. Due to different statistical characteristics, their corresponding compression encoding modes may also differ. A common compression encoding mode may specifically include high efficiency video coding (HEVC, an international video coding standard HEVC/H.265), versatile video coding (VVC, an international video coding standard VVC/H.266), an audio video coding standard (AVS, a China national video coding standard), the third generation video coding standard launched by an AVS standard group (AVS3), etc.

After video encoding, an encoded data stream (such as a point cloud code stream) needs to be encapsulated and transmitted to the service object. Video file encapsulation refers to storing encoded and compressed video code stream and audio code stream in a file in a certain format according to an encapsulation format (or a container, or a file container). The common encapsulation format includes an audio video interleaved format (AVI) or an ISOBMFF format. In one embodiment, the audio code stream and the video code stream are encapsulated in a file container in a file format such as ISOBMFF to form a media file (also known as an encapsulated file or a video file), and the media file may be composed of a plurality of tracks. For example, the media file may contain a video track, an audio track, and a subtitle track.

After executing the above encoding process and the file encapsulation process above, a content production device may transmit the media file to a client on a content consumption device. The client may then present final video content in the client after performing reverse operations such as de-encapsulation and decoding. The media file may be sent to the client based on various transmission protocols, and the transmission protocols here may include, but are not limited to: a DASH protocol, an HTTP live streaming (HLS) protocol, a smart media transport protocol (SMTP), a transmission control protocol (TCP), etc.

It may be understood that a process of de-encapsulating the file on the client is opposite to the above process of file encapsulation. The client may de-encapsulate the media file according to file format requirements at the time of encapsulation to obtain the audio code stream and the video code stream. The decoding process of the client is also opposite to the encoding process. For example, the client may decode the video code stream to restore video content, and may also decode the audio code stream to restore audio content.

Figure 3:
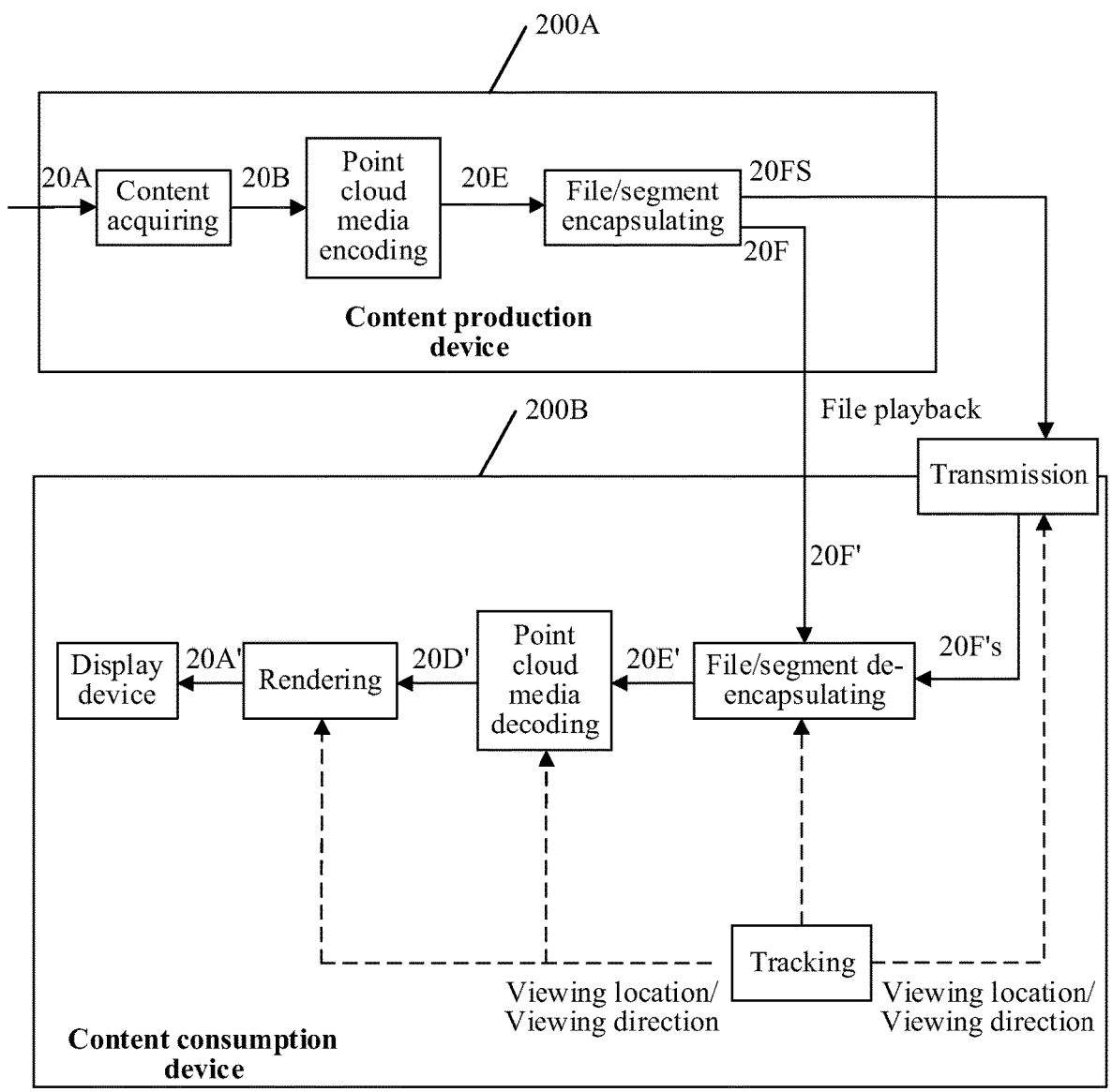
FIG. 3 is a schematic architecture diagram of an immersive media system provided by some embodiments.

FIG. 3 is a schematic architecture diagram of an immersive media system provided by some embodiments. As shown in FIG. 3, the immersive media system may include a content production device (such as a content production device 200A) and a content consumption device (such as a content consumption device 200B). The content production device may be a computer device used by a provider of point cloud media (such as a content producer of the point cloud media), and the computer device may be a terminal (such as a personal computer (PC), a smart mobile device (such as a smartphone)) or a server. The server may be an independent physical server, or a server cluster or distributed system composed of the plurality of physical servers, or a cloud server that provides basic cloud computing services such as a cloud service, a cloud database, cloud computing, a cloud function, cloud storage, a network service, cloud communication, a middleware service, a domain name service, a security service, CDN, and a big data and artificial intelligence platform. The content consumption device may refer to a computer device used by a user of the point cloud media (such as a viewer of the point cloud media, i.e. the service object). The computer device may be terminals (such as the personal computer (PC), the smart mobile device (such as the smart phone), a VR device (such as a VR helmet and VR glasses), a smart appliance, a vehicle-mounted terminal, and an aircraft), and the computer device is integrated with the client. The client here may be a client with a function of displaying data information such as text, images, audio and video, and includes, but is not limited to, a multimedia client (such as a video client), a social client (such as an instant messaging client), an information application (such as a news client), an entertainment client (such as a game client), a shopping client, a vehicle-mounted client, a browser, etc. The client may be an independent client or an embedded sub client integrated into a certain client (such as the social client), which is not limited here.

It may be understood that the data processing technology for the immersive media involved in the disclosure may be implemented based on a cloud technology. For example, a cloud server is used as the content production device. The cloud technology refers to a hosting technology that unifies a series of resources such as hardware, software, and a network within a wide area network or a local area network to achieve data computing, storage, processing and sharing.

The data processing process of the point cloud media includes a data processing process on a content production device side and a data processing process on a content consumption device side.

The data processing process on the content production device side mainly includes: (1) a process of acquiring and producing the media content of the point cloud media; and (2) a process of encoding and file encapsulation for the point cloud media. The data processing process on the content consumption device side mainly includes: (1) a process of de-encapsulating and decoding the file of the point cloud media; and (2) a process of rendering the point cloud media. In addition, a transmission process of the point cloud media is involved between the content production device and the content consumption device, the transmission process may be performed based on various transmission protocols, and the transmission protocols here may include, but are not limited to: a DASH protocol, an HLS protocol, an SMTP protocol, a TCP protocol, etc.

The various processes involved in the data processing process of the point cloud media will be introduced respectively in detail below with reference to FIG. 3.

I. The data processing process on the content production device side:

(1) The process of acquiring and producing the media content of the point cloud media.

1) the process of acquiring the media content of the point cloud media.

The media content of the point cloud media is obtained by collecting real-world sound-visual scenarios through a capture device. In one implementation, the capture device may refer to a hardware component arranged in the content production device. For example, the capture device refers to a microphone, a camera, a sensor, etc. of the terminal. In another implementation, the capture device may also be a hardware apparatus connected to the content production device, such as a camera connected to a server, used for providing an acquiring service of the media content of the point cloud media for the content production device. The capture device may include, but is not limited to: an audio device, a camera device, and a sensing device. The audio device may include an audio sensor, a microphone, etc. The camera device may include an ordinary camera, a stereo camera, a light field camera, etc. The sensing device may include a laser device, a radar device, etc. The number of the capture devices may be multiple, and these capture devices are deployed in some specific locations in a real space to simultaneously capture audio content and video content from different angles within the space. The captured audio content and video content remain synchronized in both time and space. Some embodiments may refer to the 3-dimension space media content, used for providing a viewing experience with multiple degrees of freedom (such as 6DoF), collected by a capture device deployed at a specific location as the point cloud media.

For example, illustration is made by taking acquiring of the video content of the point cloud media as an example. As shown in FIG. 3, a visual scenario 20A (such as a real-world visual scenario) may be captured by a set of camera arrays connected to the content production device 200A, or by a camera device with the plurality of cameras and sensors connected to the content production device 200A. A collection result may be source point cloud data 20B (i.e. the video content of the point cloud media).

(2) The process of producing the media content of the point cloud media.

It is to be understood that the production process of the media content of the point cloud media involved in some embodiments may be understood as the content production process of the point cloud media, and the content production of the point cloud media here is mainly composed of content production in the form of point cloud data captured by the cameras or camera arrays deployed in multiple locations. For example, the content production device may convert the point cloud media from a 3-dimension representation to a 2-dimension representation. The point cloud media here may contain geometric information, attribute information, placeholder map information, image set data, etc. The point cloud media generally requires specific processing before encoding, for example, the point cloud data require cutting, mapping and other processes before encoding.

Specifically, ① collected and input 3-dimension representation data of the point cloud media (i.e. the point cloud data above) are projected onto a 2-dimension plane, usually in a mode of orthogonal projection, perspective projection, and equi-rectangular projection (ERP). The point cloud media projected onto the 2-dimension plane is represented by data from a geometric component, a placeholder component, and an attribute component, where, the data of the geometric component provides location information of each point of the point cloud media in the 3-dimension space, the data of the attribute component provides additional attributes (such as color, texture, or material information) of each point of the point cloud media, and the data of the placeholder component indicates whether data in other components is associated with the point cloud media.

② The component data of the 2-dimension representation of the point cloud media are processed to generate blocks. According to the location of the point cloud media represented in the geometric component data, a 2-dimension plane region where the 2-dimension representation of the point cloud media is located is divided into a plurality of rectangular regions of different sizes. Each rectangular region is one block, and the block contains necessary information to back project the rectangular region into the 3-dimension space.

③ The blocks are packaged to generate the image set, the blocks are put in a 2-dimension grid, and it is ensured that effective parts of all the blocks do not overlap. The blocks generated by one point cloud media may be packaged into one or more image sets.

④ Corresponding geometric data, attribute data and placeholder data are generated based on the image set data, and the image set data, the geometric data, the attribute data and the placeholder data are combined to form the final representation of the point cloud media on the 2-dimension plane.

In some embodiments of the content production process of the point cloud media, the placeholder component may be omitted. In some embodiments of the content production process of the point cloud media, the attribute component may be omitted.

In addition, since the capture device may capture panoramic video, such video is processed by the content production device and transmitted to the content consumption device for corresponding data processing, then the service object on the content consumption device side can view 360-degree video information by performing some specific actions (such as head rotation), while performing non-specific actions (such as moving the head) cannot obtain corresponding video changes, resulting in poor VR experience. Therefore, it is necessary to additionally provide depth information matching the panoramic video to enable the service object to obtain a better immersion degree and a better VR experience, which involves a 6DoF production technology. When the service object may move freely in the simulated scenario, it is called 6DoF. When using the 6DoF production technology to produce the video content of the point cloud media, the capture device generally selects a laser device, a radar device, etc. to capture the point cloud data in space.

(2) The process of encoding and file encapsulation for the point cloud media.

The captured audio content may be directly subjected to audio encoding to form an audio code stream of the point cloud media. The captured video content may be subjected to video encoding to obtain the video code stream of the point cloud media. Here, if the 6DoF production technology is used, a specific encoding mode (such as video-based point cloud compression) needs to be used for encoding in the video encoding process. The audio code stream and the video code stream are encapsulated in a file container according to the file format of the point cloud media (such as ISOBMFF) to form a media file resource of the point cloud media. The media file resource may be the media file or the media file of the point cloud media formed by a media segment. According to the file format requirements of the point cloud media, media presentation description (i.e. MPD) information is used to record metadata of the media file resources of the point cloud media. The metadata here is a general term for information related to the presentation of the point cloud media, and the metadata may include description information of the media content, description information of a window, signaling information related to the presentation of the media content, etc. It may be understood that the content production device will store media presentation description information and media file resources formed after the data processing process.

Specifically, the collected audio is encoded into the corresponding audio code stream. The geometric information, attribute information, and placeholder map information of the point cloud media may use the conventional video encoding mode, while the image set data of the point cloud media may use an entropy encoding mode. Then, the encoded media is encapsulated in a file container according to a certain format (such as ISOBMFF and HNSS) and combined with the metadata describing the media content attributes and window metadata to form a media file or an initialization segment and media segment according to a specific media file format.

For example, as shown in FIG. 3, the content production device 200A performs point cloud media encoding on one or more data frames in the source point cloud data 20B. For example, a geometry-based point cloud compression (G-PCC, where PCC is point cloud compression) is used to obtain an encoded point cloud code stream 20E (i.e. a video code stream, such as a G-PCC code stream), including a geometry code stream (i.e. a code stream obtained by encoding the geometric information) and an attribute code stream (i.e. the code stream obtained by encoding the attribute information). Subsequently, the content production device 200A may encapsulate one or more encoded code streams into a media file 20F for local playback according to a specific media file format (such as ISOBMFF), or into a segment sequence 20Fs containing one initialization segment and the plurality of media segments for streaming transmission. In addition, the file encapsulator in the content production device 200A may also add relevant metadata into the media file 20F or the segment sequence 20Fs. Furthermore, the content production device 200A may use a certain transmission mechanism (such as DASH and SMT) to transmit the segment sequence 20Fs to the content consumption device 200B, or to transmit the media file 20F to the content consumption device 200B. In some implementations, the content consumption device 200B may be a player.

II. The data processing process on the content consumption device side.

(3) The process of de-encapsulating and decoding the file of the point cloud media.

The content consumption device may obtain the media file resources and corresponding media presentation description information of the point cloud media adaptively and dynamically from the content production device through recommendation of the content production device or according to the service object needs on the content consumption device side. For example, the content consumption device may determine a viewing direction and viewing location of the service object according to location information of the head/eyes of the service object, and then dynamically request to obtain the corresponding media file resources from the content production device based on the determined viewing direction and viewing location. The media file resources and the media presentation description information are transmitted from the content production device to the content consumption device through transmission mechanisms (such as DASH and SMT). The process of de-encapsulating the files on the content consumption device side is opposite to the file encapsulation process on the content production device side. The content consumption device de-encapsulates the media file resources according to the file format (such as ISOBMFF) requirements of the point cloud media to obtain the audio code stream and the video code stream. The decoding process on the content consumption device side is opposite to the encoding process on the content production device side. The content consumption device decodes the audio code stream and restores the audio content. The content consumption device decodes the video code stream and restores the video content.

For example, as shown in FIG. 3, the media file 20F outputted by the file encapsulator in the content production device 200A is the same as the media file 20F' inputted to a file de-encapsulator in the content consumption device 200B. The file de-encapsulator performs file de-encapsulation processing on the media file 20F' or the received segment sequence 20F's, extracts the encoded point cloud code stream 20E', meanwhile parses the corresponding metadata, then performs point cloud media decoding on the point cloud code stream 20E' to obtain the decoded video signal 20D', and may generate the point cloud data (i.e. the restored video content) from the video signal 20D'. The media file 20F and the media file 20F' may include a track format definition, which may contain constraints on a basic stream contained in the sample in the track.

(4) The process of rendering the point cloud media.

The content consumption device renders the audio content obtained from audio decoding and the video content obtained from video decoding according to the metadata related to rendering in the media presentation description information corresponding to the media file resources. Once the rendering is completed, the playback output of the content is achieved.

The immersive media system supports a data box, and the data box refers to a data block or object that includes metadata. That is, the data box contains metadata for the corresponding media content. In practical applications, the content production device may guide, through the data box, the content consumption device to consume the media file of the point cloud media. The point cloud media may include the plurality of data boxes, for example, includes an ISO base media file format box (ISOBMFF Box for short), which contains metadata for describing the corresponding information during file encapsulation.

For example, as shown in FIG. 3, the content consumption device 200B may render the above generated point cloud data based on a current viewing location, viewing direction or window, and display it on a screen of a head-mounted display or any other display devices. The current window may be determined by various types of sensors. For example, the sensor here may include a head detection sensor, and may further include a location detection sensor, or an eye detection sensor. In addition to an appropriate portion being used by the content consumption device 200B to acquire the decoded point cloud data, the current viewing location or viewing direction may further be used for decoding optimization. In addition, in transmission related to the window, the current viewing location and viewing direction will also be transmitted to a strategy module in the content consumption device 200B, and the strategy module may determine a track to be received based on the current viewing location and viewing direction.

It may be known from the above that the content consumption device may dynamically acquire the media file resources corresponding to the point cloud media from the content production device side. As the media file resources are obtained by the content production device after encoding and encapsulating the captured audio and video content, after receiving the media file resources returned by the content production device, the content consumption device can first de-encapsulate the media file resources to obtain the corresponding audio and video code streams, and then decodes the audio and video code streams, and finally presents the decoded audio and video content to the service object. The point cloud media here may include, but is not limited to video-based point cloud compression (VPCC) point cloud media, and geometry-based point cloud compression (GPCC) point cloud media.

It may be understood that a point cloud sequence is a highest level syntax structure of the point cloud code stream. The point cloud sequence starts with sequence header information (a sequence header for short), followed by one or more point cloud frames. Each point cloud frame may be composed of geometry header information (a geometry header for short), attribute header information (an attribute header for short), and one or more point cloud slice data. The point cloud slice data (slice) here are composed of a geometric slice header, geometric information, an attribute slice header, and attribute information. In an extreme case, it is assumed that there are differences between the geometry header information and attribute header information of each point cloud frame, a definition of an identifier for the current header information (an integer bounded by 0-31, representing that only a maximum of 32 header information are needed) is no longer applicable when there are a large number of point cloud frames. Therefore, it may be seen that the geometry header information or attribute header information of the different point cloud frames may be duplicated. Based on this, in order to prevent the content consumption device from repeatedly decoding the same header information when decoding the point cloud frames, the disclosure provides an indication method for decoding information of point cloud media, which can effectively save decoding resources. Specifically, after acquiring point cloud data, a content production device may encode the point cloud data to obtain a point cloud code stream containing reuse indication information. The reuse indication information here is determined based on a reuse state of a header information set, and the header information set is generated in a process of encoding the point cloud data. In some embodiments, the header information set may include all the header information used for decoding the above point cloud code stream, such as one sequence header information, one or more geometry header information, and one or more attribute header information. Here, the number of the header information in the header information set will not be limited. Each header information in the header information set contains decoding parameters used for decoding the point cloud frame. Further, in a file encapsulation process, the content production device may generate decoder configuration record information for the point cloud code stream based on the reuse state, and then may encapsulate the obtained point cloud code stream and decoder configuration record information as a media file of the immersive media. The reuse indication information and the decoder configuration record information may provide the header information set used for decoding and the reuse state of the header information set for the point cloud code stream. It may be understood that in some embodiments, the reuse state of the header information set may indicate which header information may be reused, so the subsequent content consumption device may select a corresponding decoding strategy based on the decoder configuration record information. In this way, in a scenario of the reusable header information, the waste of decoding resources caused by repeated decoding of the related header information can be avoided.

It is to be understood that the method provided by some embodiments may be applied to a server side (i.e. the content production device side), a player side (i.e. the content consumption device side), an intermediate node (such as a smart media transport (SMT) receiving entity, and an SMT sending entity), and other links of the immersive media system. A specific process that the content production device generates the point cloud code stream containing the reuse indication information, generates the decoder configuration record information according to the reuse state of the header information set, and finally obtains the media file, as well as a specific process that the content consumption device decodes the point cloud code stream based on the decoder configuration record information, may refer to the description of some embodiments corresponding to FIG. 4 to FIG. 6 below.

Figure 4:
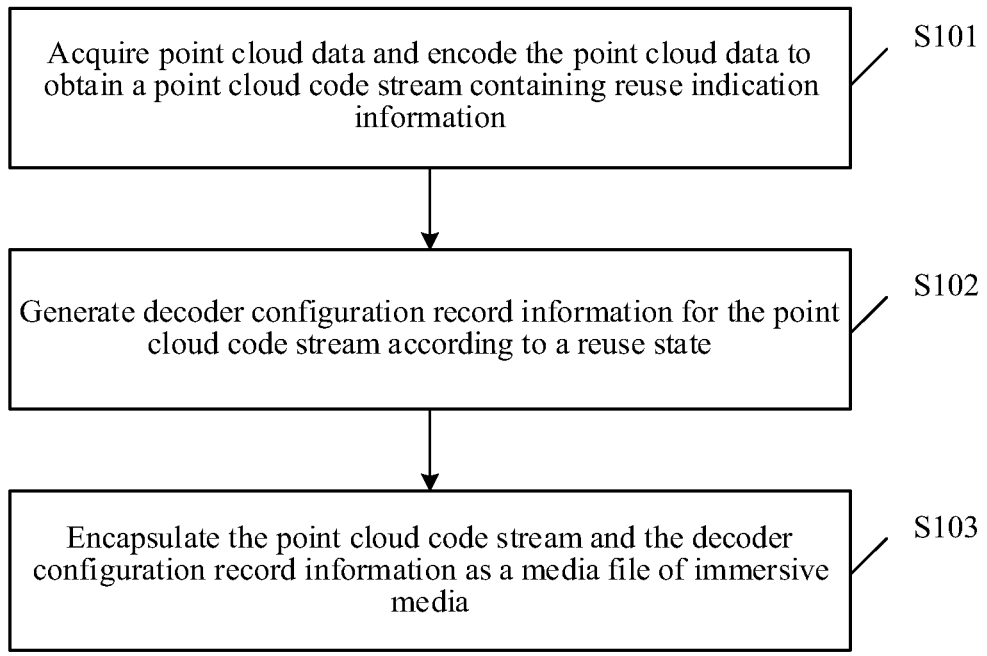
FIG. 4 is a schematic flowchart of a data processing method for immersive media provided by some embodiments.

FIG. 4 is a schematic flowchart of a data processing method for immersive media provided by some embodiments. The method may be executed by a content production device in an immersive media system (such as the content production device 200A in some embodiments correspond-ing to FIG. 3 above). For example, the content production device may be a server, and some embodiments takes server execution as an example for illustration. The method at least may include the following operation S101 to operation S103:

Operation S101: Acquire point cloud data and encode the point cloud data to obtain a point cloud code stream containing reuse indication information.

Specifically, a server may acquire point cloud data of a real-world 3-dimension object or scenario through a capture device (such as a camera array containing a plurality of cameras), or the server may generate point cloud data of a virtual 3-dimension object or scenario. The point cloud data here may be used for characterizing a spatial structure and surface attribute (such as a color and a material) of the corresponding 3-dimension object or scenario. Further, the server may encode the acquired point cloud data to obtain the point cloud code stream containing the reuse indication information. In some embodiments, before encoding the point cloud data, the server can perform specific processing on the point cloud data, such as cutting and mapping. It may be understood that the server may use a specific encoding mode to encode the point cloud data. For example, the encoding mode here may be a geometry-based point cloud compression mode (i.e. GPCC), or other encoding modes may further be used, which is not limited by some embodiments.

In some embodiments, the reuse indication information is determined based on the reuse state of the header information set, and the header information set is generated in the process of encoding the point cloud data. The header information set may include all the header information used for decoding the point cloud code stream. Since the sequence header information is highest-level header information in the point cloud code stream, it is effective for the entire point cloud code stream. Usually, there is one sequence header information in one point cloud code stream, so the disclosure mainly considers the reuse situation of the geometry header information and the attribute header information. It may be understood that each geometry header information and each attribute header information in the header information set may correspond to one reuse state. For example, the reuse state includes a reusable state and a nonreusable state. The reusable state represents that the current header information may be used repeatedly by the plurality of point cloud frames in the decoding process, and the nonreusable state represents that the current header information will be used by at most one point cloud frame in the decoding process. That is to say, in an encoding stage, the server may indicate whether there is reusable header information in the header information set and the number and specific parameter information of these reusable header information according to the reuse situation of the header information set (including the geometry header information and the attribute header information) in the entire point cloud code stream, which may be achieved by adding the reuse indication information in some embodiments.

Based on this, some embodiments provide two types of modes to add the reuse indication information, including adding the reuse indication information in sequence header information corresponding to the point cloud code stream, and adding the reuse indication information in the point cloud frame contained in the point cloud code stream, specifically as follows:

in some implementations, the reuse indication information is used for being added to the sequence header information corresponding to the point cloud code stream. The reuse indication information may include a first parameter reuse state field, and the first parameter reuse state field here may be used for indicating the reuse state of the header information set. For example, the first parameter reuse state field may be set as different field values to respectively indicate whether the header information in the point cloud code stream has the reusable state or the nonreusable state. The mode is applicable to both the geometry header information and the attribute header information.

In some embodiments, decoding resources may further be saved by limiting that the reuse indication information is used for being added to the sequence header information corresponding to the point cloud code stream, and that the reuse indication information includes the first parameter reuse state field used for indicating the reuse state of the header information set.

For example, in some embodiments, the header information set may include the geometry header information. Accordingly, the first parameter reuse state field may include a first geometry header reuse state field, and the first geometry header reuse state field here may be used for indicating a reuse state of the geometry header information in the point cloud code stream. For example, in some embodiments, based on a field value of the first geometry header reuse state field being a first state value (for example, the value is 0), it represents presence of reusable geometry header information in the point cloud code stream. That is to say, there are one or more repeatably-referenced geometry header information in the point cloud code stream at this time. In some embodiments, based on the field value of the first geometry header reuse state field being a second state value (for example, the value is 1), it represents absence of the reusable geometry header information in the point cloud code stream. That is to say, each point cloud frame in the point cloud code stream contains independent geometry header information. Specific values of the first state value and the second state value are not limited in some embodiments.

In some embodiments, the decoding resources may further be saved by limiting that based on the field value of the first geometry header reuse state field being the first state value, it represents presence of the reusable geometry header information in the point cloud code stream, and limiting that based on the field value of the first geometry header reuse state field being the second state value, it represents absence of the reusable geometry header information in the point cloud code stream.

It may be understood that the field value of the first geometry header reuse state field being the first state value, may represent that each point cloud frame in the point cloud code stream does not contain the geometry header information, and at this time, the above reuse indication information may further include a geometry header number field and geometry header indication information. The geometry header number field here is used for indicating the number of the reusable geometry header information in the point cloud code stream, where the reusable geometry header information includes all different geometry header information in the point cloud code stream. For example, the field value of the geometry header number field is M, and M is a positive integer. Accordingly, the geometry header indication information may include M reusable geometry header information. It may be understood that the M geometry header information here are different from each other. At this time, the first geometry header reuse state field with the first state value may further be used for indicating to respectively reference one of the M reusable geometry header information when a client decodes each point cloud frame in the point cloud code stream. For example, it is assumed that there is currently one point cloud code stream A, the point cloud code stream A includes the plurality of (such as 100) point cloud frames, such as a point cloud frame A1, a point cloud frame A2, . . . , and a point cloud frame A100 specifically. If there are 5 reusable geometry header information (i.e. M=5) at this time, such as geometry header information B1, geometry header information B2, . . . , and geometry header information B5, the client may refer to one of the 5 geometry header information (for example, the geometry header information B1) when decoding the point cloud frame A1. Similarly, the client may also refer to certain of the geometry header information B1 to the geometry header information B5 when decoding other point cloud frames.

In some embodiments, the decoding resources may further be saved by limiting that based on the field value of the first geometry header reuse state field being the first state value, it represents that each point cloud frame in the point cloud code stream does not contain the geometry header information, limiting that the reuse indication information further includes the geometry header number field and the geometry header indication information, and limiting that any of the plurality of reusable geometry header information is referenced during decoding of each point cloud frame in the point cloud code stream.

Similarly, it may be understood that the field value of the first geometry header reuse state field being the second state value, may represent that each point cloud frame in the point cloud code stream contains one geometry header information. At this time, the first geometry header reuse state field with the second state value may further be used for indicating to respectively reference the geometry header information contained by each point cloud frame when the client decodes each point cloud frame in the point cloud code stream. For example, still taking the above point cloud code stream A as an example, for the point cloud frame A1 to the point cloud frame A100, if there is no reusable geometry header information (that is, each point cloud frame contains its own geometry header information), the client may refer to the geometry header information contained by the point cloud frame A1 when decoding the point cloud frame A1. Similarly, the client may also refer to their respectively-carried geometry header information when decoding other point cloud frames.

In some embodiments, the decoding resources may further be saved by limiting that based on the field value of the first geometry header reuse state field being the second state value, it represents that each point cloud frame in the point cloud code stream contains one geometry header information, and limiting that the first geometry header reuse state field with the second state value is further used for indicating to reference the geometry header information contained by the point cloud frame during decoding of each point cloud frame in the point cloud code stream.

It may be known from the above that in the encoding process, the server may first distinguish the reuse state of each geometry header information in the point cloud code stream. When it is identified that there is geometry header information with the reusable state in the point cloud code stream, a ratio (which may be called a first reuse ratio) of the reuse times of the geometry header information with the reusable state to the total number of the point cloud frames may be acquired. If the first reuse ratio is less than or equal to a first threshold, at this time, the field value of the first geometry header reuse state field is not limited. That is to say, in this case, the field value of the first geometry header reuse state field may be set as the first state value, or the field value of the first geometry header reuse state field may be set as the second state value. For example, if 98 out of 100 point cloud frames use the nonreusable geometry header information, and only 2 point cloud frames use the same geometry header information, although the server will also identify that there is one geometry header information with the reusable state in the current point cloud code stream, a reuse ratio of the geometry header information (2/100) is relatively small. Therefore, it is not necessary to limit the field value of the first geometry header reuse state field to the first state value. On the contrary, if the first reuse ratio is greater than the first threshold, that is, based on the reuse ratio of the geometry header information being large, the field value of the first geometry header reuse state field may be set as the first state value. The magnitude of the first threshold is not limited in some embodiments.

Based on the value of the first geometry header reuse state field is the first state value, it indicates that all the point cloud frames in the current point cloud code stream no longer retain original geometry header information, instead, the geometry header information referenced by each point cloud frame is gathered together and subjected to de-duplication processing. Finally, one or more different geometry header information obtained after de-duplication processing may be used as the reusable geometry header information and placed in the sequence header information, which is equivalent to transforming the geometry header information referenced by all the point cloud frames into a unique set of geometry header information for the entire point cloud code stream. For example, it is assumed that the certain point cloud code stream has a total of 10 reusable geometry header information, these 10 geometry header information may become a part of the sequence header information, so even if there are 1000 point cloud frames, there is no need to repeatedly indicate these 10 geometry header information in each point cloud frame.

It may be understood that the above one or more geometry header information obtained after the de-duplication processing may all have the reusable state, or may also include at least one geometry header information with the reusable state, and the remaining geometry header information may have the nonreusable state. However, in this case, the goal of not repeatedly decoding the same geometry header information can still be achieved. That is to say, even if one geometry header information is only used once by a certain point cloud frame, it may also be called the reusable geometry header information in a scenario where the value of the first geometry header reuse state field is the first state value. In addition, even if all the geometry header information has the nonreusable state (i.e., the geometry header information referenced by each point cloud frame is different), relevant information may also be indicated by setting the field value of the first geometry header reuse state field as the second state value (i.e. the geometry header information is placed in the corresponding point cloud frame). Therefore, the method provided by some embodiments can be compatible with a scenario where the geometry header information is reusable and a scenario where the geometry header information is nonreusable.

Similarly, in some embodiments, the header information set may include the attribute header information. Accordingly, the first parameter reuse state field may include a first attribute header reuse state field, and the first attribute header reuse state field here may be used for indicating a reuse state of the attribute header information in the point cloud code stream. For example, in some embodiments, based on a field value of the first attribute header reuse state field being a third state value (for example, the value is 0), it represents presence of reusable attribute header information in the point cloud code stream. That is to say, there are one or more repeatably-referenced attribute header information in the point cloud code stream at this time. In some embodiments, based on the field value of the first attribute header reuse state field being a fourth state value (for example, the value is 1), it represents absence of the reusable attribute header information in the point cloud code stream. That is to say, each point cloud frame in the point cloud code stream contains independent attribute header information. Specific values of the third state value and the fourth state value are not limited in some embodiments.

In some embodiments, the decoding resources may further be saved by limiting that the header information set includes the attribute header information and the first parameter reuse state field includes a first attribute header reuse state field, and limiting that based on the field value of the first attribute header reuse state field is the third state value, it represents presence of the reusable attribute header information in the point cloud code stream, and based on the field value of the first attribute header reuse state field is the fourth state value, it represents absence of the reusable attribute header information in the point cloud code stream.

It may be understood that based on the field value of the first attribute header reuse state field is the third state value, it represents that each point cloud frame in the point cloud code stream does not contain the attribute header information, and at this time, the above reuse indication information may further include an attribute header number field and attribute header indication information. The attribute header number field here is used for indicating the number of the reusable attribute header information in the point cloud code stream, where the reusable attribute header information includes all different attribute header information in the point cloud code stream. For example, the field value of the attribute header number field is N, and N is a positive integer. Accordingly, the attribute header indication information may include N reusable attribute header information. It may be understood that the N attribute header information here are different from each other. At this time, the first attribute header reuse state field with the third state value may further be used for indicating to respectively reference one or more attribute header information among the N reusable attribute header information when a client decodes each point cloud frame in the point cloud code stream. For example, still taking the above point cloud code stream A as an example, if there are 8 reusable attribute header information (i.e. N=8) in the point cloud code stream A, such as attribute header information C1, attribute header information C2, . . . , and attribute header information C8, then, the client may refer to one or more attribute header information (such as the attribute header information C1 and the attribute header information C2) among these 8 attribute header information when decoding the point cloud frame A1. Similarly, one or more attribute header information among the attribute header information C1 to the attribute header information C8 may also be referenced during decoding of other point cloud frames.

In some embodiments, by limiting that based on the field value of the first attribute header reuse state field is the third state value, it represents that each point cloud frame in the point cloud code stream does not contain the attribute header information, and the reuse indication information further includes the attribute header number field and the attribute header indication information, and limiting that the attribute header indication information includes the plurality of reusable attribute header information, and one or more attribute header information among all the reusable attribute header information are referenced during decoding of each point cloud frame in the point cloud code stream, the decoding resources may further be saved.

Similarly, it may be understood that based on the field value of the first attribute header reuse state field is the fourth state value, it represents that each point cloud frame in the point cloud code stream contains one or more attribute header information, and the number of the attribute header information contained by each point cloud frame is not limited here. At this time, the first attribute header reuse state field with the fourth state value may further be used for indicating to respectively reference the attribute header information contained by each point cloud frame when the client decodes each point cloud frame in the point cloud code stream. For example, still taking the above point cloud code stream A as an example, for the point cloud frame A1 to the point cloud frame A100, if there is no reusable attribute header information (that is, each point cloud frame contains its own attribute header information), the client may refer to the attribute header information contained by the point cloud frame A1 when decoding the point cloud frame A1. Similarly, the client may also refer to their respectively-carried attribute header information when decoding other point cloud frames.

In some embodiments, the decoding resources may further be saved by limiting that based on the field value of the first attribute header reuse state field is the fourth state value, it represents that each point cloud frame in the point cloud code stream contains one or more attribute header information, and the attribute header information contained by the point cloud frame is referenced during decoding of each point cloud frame in the point cloud code stream.

It may be known from the above that in the encoding process, the server may first distinguish the reuse state of each attribute header information in the point cloud code stream. When it is identified that there is attribute header information with the reusable state in the point cloud code stream, a ratio (which may be called a second reuse ratio) of the number of the attribute header information with the reusable state to the total number of the attribute header information may be acquired. If the second reuse ratio is less than or equal to a second threshold, at this time, the field value of the first attribute header reuse state field may not limited. That is to say, in this case, the field value of the first attribute header reuse state field may be set as the third state value, or the field value of the first attribute header reuse state field may be set as the fourth state value. On the contrary, if the second reuse ratio is greater than the second threshold, that is, based on the reuse ratio of the attribute header information being large, the field value of the first attribute header reuse state field may be set as the third state value. The magnitude of the second threshold is not limited in some embodiments.

Based on the value of the first attribute header reuse state field being the third state value, it indicates that all the point cloud frames in the current point cloud code stream no longer retain original attribute header information, instead, the attribute header information referenced by each point cloud frame is gathered together and subjected to de-duplication processing. Finally, one or more different attribute header information obtained after de-duplication processing may be used as the reusable attribute header information and placed in the sequence header information, which is equivalent to transforming the attribute header information referenced by all the point cloud frames into a unique set of attribute header information for the entire point cloud code stream. It may be understood that the above one or more attribute header information obtained after the de-duplication processing may all have the reusable state, or may also include at least one attribute header information with the reusable state, and the remaining attribute header information may have the nonreusable state. However, in this case, the goal of not repeatedly decoding the same attribute header information can still be achieved. That is to say, even if one attribute header information is only used once by a certain point cloud frame, it may also be called the reusable attribute header information in a scenario where the value of the first attribute header reuse state field is the third state value. In addition, even if all the attribute header information has the nonreusable state (i.e. the attribute header information referenced by each point cloud frame is different), relevant information may also be indicated by setting the field value of the first attribute header reuse state field as the fourth state value (i.e. the attribute header information is placed in the corresponding point cloud frame). Therefore, the method provided by some embodiments can be compatible with a scenario where the attribute header information is reusable and a scenario where the attribute header information is nonreusable.

It may be understood that in the actual encoding process, when the first implementation is adopted, the server may set corresponding field values for the first geometry header reuse state field and the first attribute header reuse state field in the reuse indication information according to the specific reuse situation of the header information set respectively.

To support the above operations, some embodiments add several descriptive fields at a system layer, and relevant fields are defined to support the indication of point cloud decoding information by taking a form of extending a high-level syntax of an AVS GPCC code stream as an example. The relevant fields extended in the high-level syntax of the AVS GPCC code stream are illustrated in detail below in conjunction with the relevant syntax.

It may be understood that some embodiments may provide the sequence header information through a sequence header information structure (such as sequence_header) of the point cloud media. For ease of understanding, please refer to Table 1, and Table 1 is used for indicating the syntax of the sequence header information structure of the point cloud media provided by some embodiments:

TABLE 1

| | Descriptor |
|---|---|
| sequence_header( ) { | |
|   profile_id | u(8) |
|   level_id | u(8) |
|   sequence_parameter_set_id | ue(v) |
|   marker_bit | f(1) |
|   bounding_box_offset_x_upper | se(v) |
|   marker_bit | f(1) |
|   bounding_box_offset_x_lower | se(v) |
|   marker_bit | f(1) |
|   bounding_box_offset_y_upper | se(v) |
|   marker_bit | f(1) |
|   bounding_box_offset_y_lower | se(v) |
|   marker_bit | f(1) |
|   bounding_box_offset_z_upper | se(v) |
|   marker_bit | f(1) |
|   bounding_box_offset_z_lower | se(v) |
|   marker_bit | f(1) |
|   bounding_box_size_width_upper | ue(v) |

TABLE 1-continued

| | Descriptor |
|---|---|
| marker_bit | f(1) |
| bounding_box_size_width_lower | ue(v) |
| marker_bit | f(1) |
| bounding_box_size_height_upper | ue(v) |
| marker_bit | f(1) |
| bounding_box_size_height_lower | ue(v) |
| marker_bit | f(1) |
| bounding_box_size_depth_upper | ue(v) |
| marker_bit | f(1) |
| bounding_box_size_depth_lower | ue(v) |
| marker_bit | f(1) |
| quant_operation_upper | u(16) |
| marker_bit | f(1) |
| quant_operation_lower | u(16) |
| geomRemoveDuplicateFlag | u(1) |
| marker_bit | f(1) |
| attribute_adapt_pred | u(1) |
| attribute_qp | ue(v) |
| geometry_header_per_frame | u(1) |
| attribute_header_per_frame | u(1) |
| if (geometry_header_per_frame == 0) { | |
|   sh_num_geometry_headers | ue(v) |
|   for(i = 0; i < sh_num_geometry_headers; i++){ | |
|     geometry_header( ) | ue(v) |
|   } | |
| } | |
| if (attribute_header_per_frame == 0) { | |
|   sh_num_attribute_headers | ue(v) |
|   for(i = 0; i < sh_num_attribute_headers; i++){ | |
|     attribute_header( ) | ue(v) |
|   } | |
| } | |

The semantics of the syntax shown in Table 1 above are as follows: profile_id is a grade label field with a value of an 8-bit unsigned integer, and is used for representing a grade that a bitstream (i.e. the point cloud code stream) meets. level_id is a level label field with a value of an 8-bit unsigned integer, and is used for representing a level that the bitstream meets. sequence_parameter_set_id provides a sequence parameter set (SPS) identifier for reference by other syntax elements, and the identifier is an integer between 0 and 31. marker bit is a marker bit, indicating that the value of this bit is to be '1'.

bounding_box_offset_x upper is an upper-order part of an origin x-coordinate of a bounding box (containing a cube of the entire point cloud frame) with a value of an unsigned integer, and represents the number of bits where the x-coordinate of the bounding box is higher than 16 bits. bounding_box_offset_x lower is a lower-order part of the origin x-coordinate of the bounding box with a value of the unsigned integer, and represents the lower-16-bits of the origin x-coordinate of the bounding box. The origin x-coordinate of the bounding box is:

bounding_box_offset_x=(bounding_box_offset_x_upper)<<16+bounding_box_offset_x_lower bounding_box_offset_y_upper is an upper-order part of an origin y-coordinate of the bounding box with a value of the unsigned integer, and represents the number of bits where the y-coordinate of the bounding box is higher than 16 bits. bounding_box_offset_y_lower is a lower-order part of the origin y-coordinate of the bounding box with a value of the unsigned integer, and represents the lower-16-bits of the origin y-coordinate of the bounding box. The origin y-coordinate of the bounding box is:

bounding_box_offset_y=(bounding_box_offset_y_upper)<<16+bounding_box_offset_y_lower bounding_box_offset_z_upper is an upper-order part of an origin z-coordinate of the bounding box with a value of the unsigned integer, and represents the number of bits where the z-coordinate of the bounding box is higher than 16 bits. bounding_box_offset_z_lower is a lower-order part of the origin z-coordinate of the bounding box with a value of the unsigned integer, and represents the lower-16-bits of the origin z-coordinate of the bounding box. The origin z-coordinate of the bounding box is:

bounding_box_offset_z=(bounding_box_offset_z_upper)<<16+bounding_box_offset_z_lower bounding_box_size_width_upper is an upper-order part of a width of the bounding box with a value of the unsigned integer, and represents the number of bits where the width of the bounding box is higher than 16 bits. bounding_box_size_width_lower is a lower-order part of the width of the bounding box with a value of the unsigned integer, and represents the lower-16-bits of the width of the bounding box. The width of the bounding box is:

bounding_box_size_width=(bounding_box_size_width_upper)<<16+bounding_box_size_width_lower bounding_box_size_height_upper is an upper-order part of a height of the bounding box with a value of the unsigned integer, and represents the number of bits where the height of the bounding box is higher than 16 bits. bounding_box_size_height_lower is a lower-order part of the height of the bounding box with a value of the unsigned integer, and represents the lower-16-bits of the height of the bounding box. The height of the bounding box is:

bounding_box_size_height=(bounding_box_size_height_upper)<<16+bounding_box_size_height_lower bounding_box_size_depth_upper is an upper-order part of a depth of the bounding box with a value of the unsigned integer, and represents the number of bits where the depth of the bounding box is higher than 16 bits. bounding_box_size_depth_lower is a lower-order part of the depth of the bounding box with a value of the unsigned integer, and represents the lower-16-bits of the depth of the bounding box. The depth of the bounding box is:

bounding_box_size_depth=(bounding_box_size_depth_upper)<<16+bounding_box_size_depth_lower quant_operation_lower is an upper-order part of a quantization operation, with a value of 16-bit number, and represents the upper-16-bits of the 32-bit floating point number of the quantization operation. quant_operation_upper is a lower-order part of the quantization operation, with a value of 16-bit number, and represents the lower-16-bits of the 32-bit floating point number of the quantization operation. The quantization operation is:

quant_operation=(float)((quant_operation_upper<<16)+quant_operation_lower)

geomRemoveDuplicateFlag is a geometry removal duplicate point flag field and is a two-valued variable. A value of '1' represents the removal of duplicate points before geometric encoding, namely, points with the same geometric location; and a value of '0' represents that the duplicate points are not removed. attribute_adapt_pred is an attribute adaptive prediction flag field, and is a two-valued variable. A value of '0' represents that there is no adaptive selection prediction value method; and a value of '1' represents to allow switching from a geometric location based predictive value method to an attribute value based predictive value method. attribute_qp is an attribute quantization parameter field with a value of the unsigned integer, and represents an attribute quantization parameter.

geometry_header_per_frame is the first geometry header reuse state field. When it takes a value of 0 (i.e. the first state value), it indicates presence of one or more repeatably-referenced geometry header information (also known as a geometry header parameter set) in the current point cloud code stream, and reference of one of the geometry header information during decoding of the point cloud frame in the current point cloud code stream, and the point cloud frame no longer contains the geometry header information. When it takes the value of 1 (i.e. the second state value), it indicates that each point cloud frame contains one geometry header information, and the point cloud frame makes reference to the geometry header information contained within its frame during decoding.

attribute_header_per_frame is the first attribute header reuse state field. When it takes a value of 0 (i.e. the third state value), it indicates presence of one or more repeatably-referenced attribute header information (also known as an attribute header parameter set) in the current point cloud code stream, and reference of one or more attribute header information during decoding of the point cloud frame in the current point cloud code stream, and the point cloud frame no longer contains the attribute header information. When it takes the value of 1 (i.e. the fourth state value), it indicates that each point cloud frame contains one or more attribute header information, and the point cloud frame makes reference to the attribute header information contained within its frame during decoding.

sh_num_geometry_headers is the geometry header number field, and is used for indicating the number of repeatably-referenced geometry header information in the current point cloud code stream. geometry_header is used for indicating one geometry header information. Some embodiments may provide the geometry header information through a geometry header information structure (such as geometry_header) of the point cloud media. For ease of understanding, please refer to Table 2 together, and Table 2 is used for indicating the syntax of the geometry header information structure of the point cloud media provided by some embodiments:

TABLE 2

| | Descriptor |
|---|---|
| geometry_header( ) { | |
|   geometry_parameter_set_id | ue(v) |
|   geometry_sequence_parameter_set_id | ue(v) |
|   gps_lcu_node_size_log2_minus_one | ue(v) |
|   gps_implicit_geom_partition_flag | u(1) |
|   if( gps_implicit_geom_partition_flag ) { | |
|     gps_max_num_implicit_qtbt_before_ot | ue(v) |
|     gps_min_size_implicit_qtbt | ue(v) |
|   } | |
|   gps_single_mode_flag | u(1) |
|   gps_save_state_flag | u(1) |
|   byte_alignment( ) | |
| } | |

The semantics of the syntax shown in Table 2 above are as follows: geometry_parameter_set_id provides a geometry parameter identifier for reference by other syntax elements, and the identifier is an integer between 0 and 31.

geometry_sequence_parameter_set_id determines one SPS identifier to be used by the current geometry header information, and the identifier is an integer between 0 and 31 and maintains the same value for all the geometry header information under the same point cloud.

gps_lcu_node_size_log2_minus_one represents a node size of a geometric macro block with a value of the unsigned integer. A value of '0' represents that block structure encoding is turned off; and the value of being greater than '0' represents that block structure encoding is turned on, i.e. gps_lcu_node_size_log2=gps_lcu_node_size_log2_minus_one+1.

gps_implicit_geom_partition_flag is a geometric implicit partition flag field, and is a two-valued variable. A value of '0' represents that geometric implicit partitioning is turned off; and a value of '1' represents that geometric implicit partitioning is turned on.

gps_max_num_implicit_qtbt_before_ot represents the maximum number of quadtree/binary tree partitioning before octree partitioning, with a value of the unsigned integer, and represents the maximum number of allowed quadtree or binary tree partitioning before octree partitioning in geometric implicit partitioning. gps_min_size_implicit_qtbt represents the minimum size of quadtree/binary tree partitioning, with a value of the unsigned integer, and represents the minimum allowed partitioning size of quadtree or binary tree partitioning in geometric implicit partitioning. gps_single_mode_flag is a flag field of a geometric outlier encoding mode, and is a two-valued variable. A value of '0' represents that the geometric outlier encoding mode is turned off; and a value of '1' represents that the geometric outlier encoding mode is turned on. When the value of the geometric implicit partitioning flag field is '1', gps_max_num_implicit_qtbt_before_ot and gps_min_size_implicit_qtbt need to be limited according to a logarithmic size of a root node. gps_save_state_flag is a geometric encoding state storage flag field, and is a two-valued variable. A value of '0' represents that an encoding state is not stored, namely, an entropy encoding context and geometric encoding hash table information; and a value of '1' represents that the encoding state is stored. byte_alignment represents byte alignment.

Please refer to Table 1 above again, sh_num_attribute_headers is the attribute header number field, and is used for indicating the number of repeatably-referenced attribute header information in the current point cloud code stream. attribute_header is used for indicating one attribute header information. Some embodiments may provide the attribute header information through an attribute header information structure (such as attribute_header) of the point cloud media. For ease of understanding, please refer to Table 3 together, and Table 3 is used for indicating the syntax of the attribute header information structure of the point cloud media provided by some embodiments:

TABLE 3

| | Descriptor |
|---|---|
| attribute_header( ) { | |
|   attribute_parameter_set_id | ue(v) |
|   attribute_sequence_parameter_set_id | ue(v) |
|   withColor | u(1) |
|   withRef | u(1) |
|   transform | u(1) |
|   if (transform) { | |
|     attrTransformQpDelta | ue(v) |
|     attrTransformNumPoints | ue(v) |
|     QpOffsetDC | ue(v) |
|     QpOffsetAC | ue(v) |
|     if (withColor) { | |

TABLE 3-continued

| | Descriptor |
|---|---|
|     chromaQpOffsetDC | ue(v) |
|     chromaQpOffsetAC | ue(v) |
|   } | |
| } | |
| if (withColor) { | ue(v) |
|     maxNumOfNeighbours | ue(v) |
|     cross_component_Pred | u(1) |
|     chromaQpOffsetCb | se(v) |
|     chromaQpOffsetCr | se(v) |
| } | |
| if (withRef) { | |
|     nearestPredParam1 | ue(v) |
|     nearestPredParam2 | ue(v) |
|     axisBias | ue(v) |
| } | |
| outputBitDepth | ue(v) |
| numOflevelOfDetail | |
| maxNumOfPredictNeighbours | ue(v) |
| intraLodFlag | u(1) |
| byte_alignment( ) | |
| } | |

The semantics of the syntax shown in Table 3 above are as follows: attribute_parameter_set_id provides an attribute parameter identifier for reference by other syntax elements, and the identifier is an integer between 0 and 31.

attribute_sequence_parameter_set_id determines one SPS identifier to be used by the current attribute header information, and the identifier is an integer between 0 and 31 and maintains the same value for all the attribute header information under the same point cloud. withColor is a color attribute containing flag field, and is a two-valued variable. A value of '1" represents that the point cloud contains a color attribute; and a value of '0' represents that the point cloud does not contain the color attribute. withRef is a reflectivity attribute containing flag field, and is a two-valued variable. A value of '1' represents that the point cloud contains a reflectivity attribute; and a value of '0' represents that the point cloud does not contain the reflectivity attribute. transform is an attribute transformation algorithm flag field, is a two-valued variable and is used for controlling whether to use wavelet transform to encode the attribute. Wavelet transform is used when the value is '1', and a prediction method is used to encode the attribute when the value is '0'. attrTransformQpDelta is a difference value of attribute transformation coefficient quantization parameters, is the unsigned integer and is used for representing a difference value with attribute residual quantization parameters. Attribute transformation coefficient quantization parameter (attrTransformQp)=attribute quantization parameter (attrQuantParam)+attrTransformQpDelta.

attrTransformNumPoints represents attribute transformation points, is the unsigned integer, and is used for representing the points of attribute transformation, namely, wavelet transform using attrTransformNumPoints.

attrTransformNumPoints=0 represents using all the points in the slice for wavelet transform. QpOffsetDC represents quantization offset of a direct current (DC) coefficient of a brightness component. QpOffsetAC represents quantization offset of an alternating current (AC) coefficient of the brightness component. chromaQpOffsetDC represents quantization offset of a DC coefficient of a chrominance component. chromaQpOffsetAC represents quantization offset of an AC coefficient of a chrominance component. maxNumOfNeighbours represents the maximum number of neighbor points searched, is the unsigned integer, and is used for controlling a search range of neighbor candidate points and the number of hardware cached points during attribute prediction. maxNumOfNeighbours in a code stream that meets this part shall not exceed 1024. cross_component_pred represents attribute residual secondary prediction, and is a two-valued variable. A value of '1' represents that attribute residual secondary prediction is allowed; and a value of '0' represents that attribute residual secondary prediction is not allowed. chromaQpOffsetCb represents offset of a chrominance channel Cb quantization parameter, is a signed integer, and is used for controlling the Cb channel quantization parameter, with a value range of −16 to 16. If chromaQpOffsetCb does not exist in the current attribute header information, the value of chromaQpOffsetCb is 0. That is, choramQpCb (i.e. chrominance channel Cb quantization parameter)=Clip3(minQP, maxQP, attribute_qp+chromaQpOffsetCb). The quantization parameter of a brightness channel is lumaQp=attribute_qp, a minimally supported quantization parameter is minQP=0, and a maximally supported quantization parameter is maxQP=63. chromaQpOffsetCr represents offset of a chrominance channel Cr quantization parameter, is a signed integer, and is used for controlling the Cr channel quantization parameter, with a value range of −16 to 16. If chromaQpOffsetCr does not exist in the current attribute header information, the value of chromaQpOffsetCr is 0. That is, choramQpCr=Clip3(minQP,maxQP,attribute_qp+chromaQpOffsetCr). The quantization parameter of the brightness channel is lumaQp=attribute_qp, the minimally supported quantization parameter is minQP=0, and the maximally supported quantization parameter is maxQP=63. nearestPredParam1 is the nearest neighbor prediction parameter 1, is the unsigned integer, and is used for controlling a threshold for nearest neighbor prediction. nearestPredParam2 is the nearest neighbor prediction parameter 2, is the unsigned integer, and is used for controlling a threshold for nearest neighbor prediction. The threshold is represented as attrQuantParam*nearestPredParam1+nearestPredParam1.

axisBias is a spatial bias coefficient, is the unsigned integer, and is used for controlling offset in a Z direction in calculation of an attribute prediction value. outputBitDepth represents an attribute output bit depth, is an unsigned integer, and is used for controlling the attribute output bit depth. numOflevelOfDetail represents the number of level of detail (LoD) layers, is an unsigned integer, and is used for controlling the number of LOD layers partitioned during attribute prediction. numOflevelOfDetail in the code stream that meets this part shall not exceed 32. maxNumOfPredictNeighbours represents the maximally-selected number of neighbor points for prediction, is an unsigned integer, and is used for limiting the number of neighbor points selected during attribute prediction. maxNumOfPredictNeighbours in the code stream that meets this part shall not exceed 16. intraLodFlag is an LoD intra-layer prediction flag field, is a two-valued variable, and is used for controlling whether intra layer prediction is turned on. When the value is '1', intra layer prediction is turned on, and when the value is '0', intra layer prediction is turned off.

The sequence header information shown in Table 1 above may be contained in the point cloud code stream. For example, it may appear once at the beginning of the point cloud code stream or may appear multiple times throughout the entire point cloud code stream, so that decoding may be performed normally from the middle of the point cloud code stream when using a random access mode. Some embodiments do not limit the location of the sequence header information in the point cloud code stream. It may be known from the above that after adding geometry_header, attribute_header and other information in the sequence header information, there is no need to carry these header information in the point cloud frame. In this way, in a scenario where the relevant header information is reusable, each header information is decoded once, which is equivalent to optimizing a structure of the point cloud frame, thereby saving resources occupied by decoding. The sequence header information structure shown in Table 1 may also support further optimization and extension, which is not limited in the disclosure.

In the second optional implementation, the reuse indication information is used for being added to the point cloud frame contained in the point cloud code stream. The point cloud code stream may include the plurality of point cloud frames, and the plurality of point cloud frames may include a target point cloud frame. The target point cloud frame may be any one of the plurality of point cloud frames, thus reuse indication information in the target point cloud frame may include a second parameter reuse state field, and the second parameter reuse state field here may be used for indicating a reuse state of a header information set referenced by decoding the target point cloud frame. For example, the second parameter reuse state field may be set as different field values to indicate whether the header information used by decoding the target point cloud frame is reusable. The mode is applicable to both the geometry header information and the attribute header information.

In some embodiments, the decoding resources may further be saved by limiting that the reuse indication information is used for being added to the point cloud frame contained in the point cloud code stream, and that the reuse indication information in the target point cloud frame includes the second parameter reuse state field.

For example, in the first embodiment, the plurality of point cloud frames above may further include a first historical point cloud frame, a generation timestamp of the first historical point cloud frame is earlier than a generation timestamp of the target point cloud frame, and the first historical point cloud frame is a previous frame of the target point cloud frame. The header information set may include the geometry header information. Accordingly, the second parameter reuse state field may include a second geometry header reuse state field, and the second geometry header reuse state field here may be used for indicating a reuse state of the geometry header information referenced by decoding the target point cloud frame. For example, in some embodiments, based on a field value of the second geometry header reuse state field being a fifth state value (for example, the value is 1), it represents that geometry header information referenced by the first historical point cloud frame may be repeatedly used during decoding of the target point cloud frame. In some embodiments, based on a field value of the second geometry header reuse state field being a sixth state value (for example, the value is 0), it represents that the target point cloud frame contains the geometry header information. At this time, the second geometry header reuse state field with the sixth state value may be further used for indicating to reference the geometry header information contained by the target point cloud frame when the client decodes the target point cloud frame.

In some embodiments, the decoding resources may further be saved by limiting that the header information set includes the geometry header information, the second parameter reuse state field includes a second geometry header reuse state field, and the second geometry header reuse state field is used for indicating the reuse state of the geometry header information referenced by decoding the target point cloud frame, and limiting that based on the field value of the second geometry header reuse state field is the fifth state value, it represents repeated use of the geometry header information referenced by the first historical point cloud frame during decoding of the target point cloud frame.

To support the above operations, the form of extending the high-level syntax of the AVS GPCC code stream is still taken as an example here. It may be understood that some embodiments may provide the reuse indication information related to the geometry header information through the geometry header information structure (such as geometry_header) of the point cloud media. For ease of understanding, please refer to Table 4, and Table 4 is used for indicating the syntax of the geometry header information structure of the point cloud media provided by some embodiments:

TABLE 4

| | Descriptor |
|---|---|
| geometry_header( ) { | |
|   reuse_pre_geo_header_flag | u(1) |
|   if(reuse_pre_geo_header_flag == 0){ | |
|     geometry_parameter_set_id | ue(v) |
|     gps_lcu_node_size_log2_minus_one | ue(v) |
|     gps_implicit_geom_partition_flag | u(1) |
|     if( gps_implicit_geom_partition_flag ) { | |
|       gps_max_num_implicit_qtbt_before_ot | ue(v) |
|       gps_min_size_implicit_qtbt | ue(v) |
|     } | |
|     gps_single_mode_flag | u(1) |
|     gps_save_state_flag | u(1) |
|   } | |
|   byte_alignment( ) | |
| } | |

The semantics of the syntax shown in Table 4 above are as follows: reuse_pre_geo_header_flag is the second geometry header reuse state field. A value of 1 (i.e. the fifth state value) represents that the geometry header information used by decoding the current point cloud frame is the same as the geometry header information used in the previous frame, and a value of 0 (i.e. the sixth state value) represents that decoding of the current point cloud frame uses the independent geometry header information. At this time, relevant parameter fields may further be indicated, such as geometry_parameter_set_id and gps_lcu_node_size_log2_minus_one, and the specific semantics of these fields may refer to the syntax semantics shown in Table 2 above. The geometry header information structure shown in Table 4 may also support further optimization and extension, which is not limited in the disclosure.

For another example, in the second embodiment, the plurality of point cloud frames above may further include a second historical point cloud frame, a generation timestamp of the second historical point cloud frame is earlier than a generation timestamp of the target point cloud frame, that is to say, the second historical point cloud frame may be any frame before the target point cloud frame, which is not limited by some embodiments. The header information set may include the geometry header information. Accordingly, the second parameter reuse state field may include the second geometry header reuse state field, and the second geometry header reuse state field here may be used for indicating the reuse state of the geometry header information referenced by decoding the target point cloud frame. For example, in some embodiments, based on the field value of the second geometry header reuse state field is the fifth state value (for example, the value is 1), the reuse indication information in the target point cloud frame may further include a reused geometry header identification field, and the reused geometry header identification field is used for indicating an identifier of the geometry header information used during decoding the target point cloud frame. At this time, the second geometry header reuse state field with the fifth state value may be used for indicating to reference geometry header information indicated by the reused geometry header identification field during decoding of the target point cloud frame, and the geometry header information indicated by the reused geometry header identification field is the geometry header information referenced by the second historical point cloud frame.

In some embodiments, by limiting that the header information set includes the geometry header information, and the second parameter reuse state field includes the second geometry header reuse state field, and limiting that based on the field value of the second geometry header reuse state field is the fifth state value, the reuse indication information in the target point cloud frame further includes the reused geometry header identification field, the decoding resources may further be saved.

In some embodiments, based on a field value of the second geometry header reuse state field being a sixth state value (for example, the value is 0), it represents that the target point cloud frame contains the geometry header information. At this time, the second geometry header reuse state field with the sixth state value is further used for indicating to reference the geometry header information contained by the target point cloud frame when the client decodes the target point cloud frame.

The decoding resources may further be saved by limiting that based on the field value of the second geometry header reuse state field being the sixth state value, it represents that the target point cloud frame contains the geometry header information, and limiting that the geometry header information contained by the target point cloud frame is referenced during decoding the target point cloud frame. To support the above operations, the form of extending the high-level syntax of the AVS GPCC code stream is still taken as an example here. It may be understood that some embodiments may provide the reuse indication information related to the geometry header information through the geometry header information structure (such as geometry_header) of the point cloud media. For ease of understanding, please refer to Table 5, and Table 5 is used for indicating the syntax of the geometry header information structure of the point cloud media provided by some embodiments:

TABLE 5

| | Descriptor |
|---|---|
| geometry_header( ) { | |
|   reused_geo_parameter_set_flag | u(1) |
|   if(reused_geo_parameter_set_flag == 1){ | |
|     reused_geometry_parameter_set_id | ue(v) |
|   }else{ | |
|   geometry_parameter_set_id | ue(v) |
|   gps_lcu_node_size_log2_minus_one | ue(v) |
|   gps_implicit_geom_partition_flag | u(1) |
|   if( gps_implicit_geom_partition_flag ) { | |
|     gps_max_num_implicit_qtbt_before_ot | ue(v) |
|     gps_min_size_implicit_qtbt | ue(v) |
|   } | |
|   gps_single_mode_flag | u(1) |
|     gps_save_state_flag | u(1) |
|   } | |
|   byte_alignment( ) | |
| } | |

The semantics of the syntax shown in Table 5 above are as follows: reused_geo_parameter_set_flag is the second geometry header reuse state field, with a value of 1 (i.e. the fifth state value), and represents that the geometry header information used for decoding the current point cloud frame repeatedly uses a certain frame of geometry header information before the current point cloud frame. At this time, reused_geometry_parameter_set_id may further be indicated, and reused_geometry_parameter_set_id here is the reused geometry header identification field and is used for indicating the identifier of the geometry header information used during the decoding of the current point cloud frame. A value of 0 (i.e. the sixth state value) of reused_geo_parameter_set_flag represents that decoding of the current point cloud frame uses the independent geometry header information. At this time, relevant parameter fields may further be indicated, such as geometry_parameter_set_id and gps_lcu_node_size_log2_minus_one, and the specific semantics of these fields may refer to the syntax semantics shown in Table 2 above. The geometry header information structure shown in Table 5 may also support further optimization and extension, which is not limited in the disclosure.

By comparing the two embodiments instanced above, it may be known that in the first embodiment, when the value of the second geometry header reuse state field is the fifth state value, it represents that the geometry header information used by decoding the target point cloud frame is the same as the geometry header information used in the previous frame (i.e. the first historical point cloud frame) by default, so the corresponding identification field may not be used to indicate it; and when the value of the second geometry header reuse state field is the sixth state value, it represents that decoding of the target point cloud frame uses the independent geometry header information. In the second embodiment, when the value of the second geometry header reuse state field is the fifth state value, the geometry header information used by decoding the target point cloud frame is the certain frame (i.e. the second historical point cloud frame) of geometry header information before the target point cloud frame. When the value of the second geometry header reuse state field is the sixth state value, it represents that decoding of the target point cloud frame uses the independent geometry header information. It may be seen that the mode described in the second embodiment may be compatible with the mode described in the first embodiment, that is, the second historical point cloud frame may include the first historical point cloud frame. Both modes are equivalent to optimizing the structure of the geometry header information. The specific mode used may be selected according to the actual situation, which is not limited here.

Specific values of the fifth state value and the sixth state value are not limited in some embodiments.

Similarly, in the first embodiment above, the plurality of point cloud frames may further include a third historical point cloud frame, a generation timestamp of the third historical point cloud frame is earlier than the generation timestamp of the target point cloud frame, and the third historical point cloud frame is a previous frame of the target point cloud frame. It may be understood that the third historical point cloud frame here is the same point cloud frame as the first historical point cloud frame above. The header information set may include the attribute header information. Accordingly, the second parameter reuse state field may include the second attribute header reuse state field, and the second attribute header reuse state field here may be used for indicating a reuse state of attribute header information referenced by decoding the target point cloud frame. For example, based on a field value of the second attribute header reuse state field being a seventh state value (for example, the value is 1), it represents that attribute header information referenced by the third historical point cloud frame may be repeatedly used during decoding of the target point cloud frame. In some embodiments, based on the field value of the second attribute header reuse state field being an eighth state value (for example, the value is 0), it represents that the target point cloud frame contains the attribute header information. At this time, the second attribute header reuse state field with the eighth state value is further used for indicating to reference the attribute header information contained by the target point cloud frame when the client decodes the target point cloud frame.

In some embodiments, the decoding resources may further be saved by limiting that the header information set includes the attribute header information, and the second parameter reuse state field includes the second attribute header reuse state field, and limiting that based on the field value of the second attribute header reuse state field being the seventh state value, it represents repeated use of the attribute header information referenced by the third historical point cloud frame during decoding of the target point cloud frame.

To support the above operations, the form of extending the high-level syntax of the AVS GPCC code stream is still taken as an example here. It may be understood that some embodiments may provide the reuse indication information related to the attribute header information through an attribute header information structure (such as attribute_header) of the point cloud media. For ease of understanding, please refer to Table 6, and Table 6 is used for indicating the syntax of the attribute header information structure of the point cloud media provided by some embodiments:

TABLE 6

|  | Descriptor |
|---|---|
| attribute_header( ) { | |
|    reuse_pre_attr_header_flag | u(1) |
|    if(reuse_pre_attr_header_flag == 0){ | |
|       attribute_parameter_set_id | |
|       withColor | u(1) |
|       withRef | u(1) |
|       ... | |
|       byte_alignment( ) | |
| } | |

The semantics of the syntax shown in Table 6 above are as follows: reuse_pre_attr_header_flag is the second attribute header reuse state field. A value of 1 (i.e. the seventh state value) represents that the attribute header information used by decoding the current point cloud frame is the same as the attribute header information used in the previous frame, and a value of 0 (i.e. the eighth state value) represents that decoding of the current point cloud frame uses the independent attribute header information. At this time, relevant parameter fields may further be indicated, such as attribute_parameter_set_id and withColor, and the specific semantics of these fields may refer to the syntax semantics shown in Table 3 above. The attribute header information structure shown in Table 6 may also support further optimization and extension, which is not limited in the disclosure.

Similarly, in the second embodiment above, the plurality of point cloud frames may further include a fourth historical point cloud frame, a generation timestamp of the fourth historical point cloud frame is earlier than a generation timestamp of the target point cloud frame, that is to say, the fourth historical point cloud frame may be any frame before the target point cloud frame. The fourth historical point cloud frame here and the second historical point cloud frame above may be the same point cloud frame or the different point cloud frames, which is not limited by some embodiments. The header information set may include the attribute header information. Accordingly, the second parameter reuse state field may include the second attribute header reuse state field, and the second attribute header reuse state field here is used for indicating the reuse state of the attribute header information referenced by decoding the target point cloud frame. For example, in some embodiments, based on the field value of the second attribute header reuse state field is the seventh state value (for example, the value is 1), the reuse indication information in the target point cloud frame may further include a reused attribute header identification field, and the reused attribute header identification field is used for indicating an identifier of the attribute header information used during decoding the target point cloud frame. At this time, the second attribute header reuse state field with the seventh state value may be used for indicating to reference attribute header information indicated by the reused attribute header identification field during decoding of the target point cloud frame, and the attribute header information indicated by the reused attribute header identification field is the attribute header information referenced by the fourth historical point cloud frame.

In some embodiments, by limiting that the header information set includes the attribute header information, and the second parameter reuse state field includes the second attribute header reuse state field, and limiting that based on the field value of the second attribute header reuse state field being the seventh state value, the reuse indication information in the target point cloud frame further includes the reused attribute header identification field, the decoding resources may further be saved.

In some embodiments, based on the field value of the second attribute header reuse state field being the eighth state value (for example, the value is 0), it represents that the target point cloud frame contains the attribute header information. At this time, the second attribute header reuse state field with the eighth state value is further used for indicating to reference the attribute header information contained in the target point cloud frame when the client decodes the target point cloud frame.

In some embodiments, the decoding resources may further be saved by limiting that based on the field value of the second attribute header reuse state field being the eighth state value, it represents that the target point cloud frame contains the attribute header information, and the attribute header information contained by the target point cloud frame is referenced during decoding the target point cloud frame. To support the above operations, the form of extending the high-level syntax of the AVS GPCC code stream is still taken as an example here. It may be understood that some embodiments may provide the reuse indication information related to the attribute header information through an attribute header information structure (such as attribute_header) of the point cloud media. For ease of understanding, please refer to Table 7, and Table 7 is used for indicating the syntax of the attribute header information structure of the point cloud media provided by some embodiments:

TABLE 7

| | Descriptor |
|---|---|
| attribute_header( ) { | |
|    reused_attr_parameter_set_flag | u(1) |
|    if(reused_attr_parameter_set_flag == 1){ | |
|      reused_attribute_parameter_set_id | ue(v) |
|    }else{ | |
|      attribute_parameter_set_id | ue(v) |
|      withColor | |
|      withRef | u(1) |
|    ... | |
|    byte_alignment( ) | |
| } | |

The semantics of the syntax shown in Table 7 above are as follows: reused_attr_parameter_set_flag is the second attribute header reuse state field, with a value of 1 (i.e. the seventh state value), and represents that the attribute header information used for decoding the current point cloud frame repeatedly uses a certain frame of attribute header information before the current point cloud frame. At this time, reused_attribute_parameter_set_id may further be indicated, and reused_attribute_parameter_set_id here is the reused attribute header identification field and is used for indicating the identifier of the attribute header information used during the decoding of the current point cloud frame. A value of 0 (i.e. the eighth state value) of reused_attr_parameter_set_flag represents that decoding of the current point cloud frame uses the independent attribute header information. At this time, relevant parameter fields may further be indicated, such as attribute_parameter_set_id and withColor, and the specific semantics of these fields may refer to the syntax semantics shown in Table 3 above. The attribute header information structure shown in Table 7 may also support further optimization and extension, which is not limited in the disclosure.

By comparing the two embodiments instanced above, it may be known that in the first embodiment, when the value of the second attribute header reuse state field is the seventh state value, it represents that the attribute header information used by decoding the target point cloud frame is the same as the attribute header information used in the previous frame (i.e. the third historical point cloud frame) by default, so the corresponding identification field may not be used to indicate it; and when the value of the second attribute header reuse state field is the eighth state value, it represents that decoding of the target point cloud frame uses the independent attribute header information. In the second embodiment, when the value of the second attribute header reuse state field is the seventh state value, the attribute header information used by decoding the target point cloud frame is the certain frame (i.e. the fourth historical point cloud frame) of attribute header information before the target point cloud frame. When the value of the second attribute header reuse state field is the eighth state value, it represents that decoding of the target point cloud frame uses the independent attribute header information. It may be seen that the mode described in the second embodiment may be compatible with the mode described in the first embodiment, that is, the fourth historical point cloud frame may include the third historical point cloud frame. Both modes are equivalent to optimizing the structure of the attribute header information. The specific mode used may be selected according to the actual situation, which is not limited here.

Specific values of the seventh state value and the eighth state value are not limited in some embodiments.

It may be understood that in the actual encoding process, when the second implementation is adopted, the server may set corresponding field values for the second geometry header reuse state field and the second attribute header reuse state field in the reuse indication information according to the specific reuse situation of the header information set respectively.

Compared with the first implementation above, it may be known that in the first implementation, when there is reusable header information (such as the geometry header information or the attribute header information) in the point cloud code stream, the structure of the corresponding header information may be no longer retained in the point cloud frame, but added to the sequence header information; and when there is no reusable header information in the point cloud code stream, the structure of the corresponding header information may be retained in the point cloud frame. In the second implementation, regardless of the presence of the reusable header information, the structure of the header information within each point cloud frame may be retained. However, in a case of presence of the reusable header information, the corresponding header information is subjected to structure optimization to indicate the reused header information to avoid repeated decoding. In practical applications, any of the above listed modes maybe selected to add the reuse indication information, which is not limited in some embodiments.

It may be understood that for one point cloud code stream, there may be both the reusable geometry header information and the reusable attribute header information at the same time, or there may be neither the reusable geometry header information nor the reusable attribute header information, or in some embodiments, there may be only the reusable geometry header information, or only the reusable attribute header information, which is not limited in some embodiments.

In addition to the several implementations illustrated in some embodiments by examples, similar effects may further be achieved through other modes to distinguish the reusability of the header information, which is not listed one by one here.

Operation S102: Generate decoder configuration record information for the point cloud code stream according to the reuse state.

When the server encapsulates the point cloud code stream obtained in operation S101 above, metadata information related to a decoder configuration may be added according to the reuse situation of the header information set. This metadata information may be called the decoder configuration record information, which defines configuration information used by a point cloud content decoder (in the client) and may support initialization of the decoder. Specifically, the server may determine the header information number and header indication information based on the reuse state of the header information set, so as to generate the decoder configuration record information containing a header information number field and the header indication information. The header information number field is used for indicating the number of header information (including the sequence header information, the geometry header information, and the attribute header information) referenced by decoding the point cloud code stream. For example, a field value of the header information number field is K, and K is a positive integer. It may be understood that the K header information here is different from each other, and may include the reusable header information in the header information set. Here, the value of K is not limited. Accordingly, the header indication information may include K header basic information, and each header basic information corresponds to one header information.

In some embodiments, by determining the header information number and the header indication information based on the reuse state, and generating the decoder configuration record information containing the header information number field corresponding to the header information number and the header indication information, an accuracy rate of the decoder configuration record information may be increased, and the decoding resources may further be saved.

In some embodiments, each header basic information contains a header information type field, a header information identification field, a header information length field, and a header information description field, or other extending fields, which is not listed on by one here. For ease of understanding, illustration is made here by taking $i^{th}$ header information among the K header information as an example, and i is a positive integer less than or equal to K.

It may be understood that in the header basic information corresponding to the $i^{th}$ header information, the header information type field may be used for indicating a type of the $i^{th}$ header information. Different values of the header information type field may indicate different header information types. For example, in some embodiments, based on a field value of the header information type field being a first type field value (for example, the value is 0), it represents that the $i^{th}$ header information is sequence header information. It may be understood that since the sequence header information is effective for all the point cloud frames, it may be understood as the reusable header information.

In some embodiments, the decoding resources may further be saved by limiting that the header basic information contains the header information type field, the header information identification field, the header information length field, and the header information description field.

In some embodiments, based on the field value of the header information type field being a second type field value (for example, the value is 1), it represents that the $i^{th}$ header information is geometry header information; and based on the field value of the header information type field being a third type field value (for example, the value is 2), it represents that the $i^{th}$ header information is attribute header information. The values of the first type field value, the second type field value and the third type field value are not limited in some embodiments. In addition, the header information identification field may be used for indicating an identifier of the $i^{th}$ header information, and the identifier of each header is unique. The header information length field may be used for indicating a length of the $i^{th}$ header information, and the length of the $i^{th}$ header information is not limited in some embodiments. The header information description field may be used for indicating the $i^{th}$ header information. It may be understood that the specific type and structure of the $i^{th}$ header information are not limited here, so the corresponding header information may be parsed based on the length indicated by the header information length field (for example, 20 bytes) subsequently.

In some embodiments, the decoding resources may further be saved by limiting that based on the field value of the header information type field being the first type field value, it represents that the header information is the sequence header information, and by limiting that based on the field value of the header information type field being the second type field value, it represents that the header information is the geometry header information, and based on the field value of the header information type field being the third type field value, it represents that the header information is the attribute header information.

It may be understood that a process of file encapsulation is a process of constructing the plurality of data boxes, and the data boxes are diverse. The decoder configuration record information in some embodiments may be added as the metadata information to a certain data box to describe the header information of the media file, and the media file may include one or more tracks, which is not limited in some embodiments. In general, one media file may contain one decoder configuration record information. For example, when geometric data and attribute data of the point cloud media are encapsulated in the different tracks respectively, the decoder configuration record information may be placed in a track where the geometric data are located. In some embodiments, one track may correspond to one decoder configuration record information. For example, the decoder configuration record information related to a sequence header and geometry header may be placed in the track where the geometric data are located, and the decoder configuration record information related to the attribute header may be placed in a track where the attribute data are located, which is not limited in some embodiments.

It may be understood that the decoder configuration record information may be applicable to the several modes of generating the reuse indication information listed in operation S101 above, and may also be applicable to a scenario where the header information is reusable and a scenario where the header information is nonreusable. For example, when there is no reusable header information in the point cloud code stream, the decoder configuration record information may at least include one header basic information, namely, the header basic information corresponding to the sequence header information. For another example, when there is reusable geometry header information/attribute header information in the point cloud code stream, the decoder configuration record information may include the header basic information corresponding to the reusable geometry header information/attribute header information and the header basic information corresponding to the sequence header information. In this way, since the decoder configuration record information indicates data related to the reusable header information, when the decoder configuration record information appears once at a track entry, relevant samples (i.e. the point cloud frames) may no longer carry the header information, and the decoder can decode the header information once without the need of repeated decoding, thus saving the decoding resources.

To support the above operations, here is an example in the form of extending the ISOBMFF data box to describe field extension some embodiments at a file encapsulation level. It may be understood that some embodiments may provide the decoder configuration record information through a point cloud decoder configuration record structure (such as GPCCDecoderConfigurationRecord). For ease of understanding, please refer to Table 8, and Table 8 is used for indicating the syntax of the point cloud decoder configuration record structure provided by some embodiments:

TABLE 8

```
aligned(8) class GPCCDecoderConfigurationRecord {
    unsigned int(8)   configurationVersion = 1;
    unsigned int(8)   num_parameter_headers;
    for (i=1; i<=num_parameter_headers; i++) {
        unsigned int(4) header_type;
        unsigned int(8) header_id;
```

TABLE 8-continued

```
        unsigned int(8) header_length;
        bit(8*header_length) header;
    }
}
```

The semantics of the syntax shown in Table 8 above are as follows: configurationVersion is used for indicating a version of the decoder configuration record information. If the decoder cannot identify the value of this field, the decoder shall not decode the corresponding point cloud content. num_parameter_headers is the header information number field, and is used for indicating the total number of the sequence header information, geometry header information, or attribute header information used for current track decoding. header_type is the header information type field, and is used for indicating the type of the header information. The field takes the value of 0 (i.e. the first type field value), representing that the current header information is the sequence header information; the field takes the value of 1 (i.e. the second type field value), representing that the current header information is the geometry header information; and the field takes the value of 2 (i.e. the third type field value), representing that the current header information is the attribute header information. header_id is the header information identification field, and is used for indicating an identifier of the current header information. header_length is the header information length field, and is used for indicating a length of the current header information. header is the header information description field, and is used for indicating the specific header related field. The parsing of the field is to follow the definition of the header information in the corresponding coding standard. For example, when the header information is the sequence header information, the syntax of header may refer to the syntax of sequence_header shown in Table 1 above; when the header information is the geometry header information, the syntax of header may refer to the syntax of geometry_header shown in Table 2, Table 4, or Table 5 above; and when the header information is the attribute header information, the syntax of header may refer to the syntax of attribute_header shown in Table 3, Table 6, or Table 7 above. The point cloud decoder configuration record structure shown in Table 8 may also support further optimization and extension, which is not limited in the disclosure.

In addition, in order to provide a more detailed indication of a corresponding relationship between the point cloud frame and the reusable header information, so that the client can decode the corresponding header information at an appropriate time point, some embodiments provide two indication modes, including directly indicating the corresponding relationship between the point cloud frame and the reusable header information in the decoder configuration record information, and indicating the corresponding relationship between the point cloud frame and the reusable header information in a mode of partitioning parameter set index sample groups, which are specifically as follows:

in some embodiments, in the first implementation, the corresponding relationship between the point cloud frame and the header information may be indicated by indicating a point cloud frame index number range corresponding to the header information. For example, each header basic information may further include a minimum point cloud frame index field and a maximum point cloud frame index field. For example, illustration is made still by taking the $i^{th}$ header information as an example, in the header basic information corresponding to the $i^{th}$ header information, the minimum sample index field may be used for indicating a minimum value of the point cloud frame index number range referencing the $i^{th}$ header information, and the maximum sample index field may be used for indicating a maximum value of the point cloud frame index number range referencing the $i^{th}$ header information. It may be understood that the point cloud frame within the point cloud frame index number range may refer to the $i^{th}$ header information during decoding, and the point cloud frame within the point cloud frame index number range belongs to the point cloud code stream.

In some embodiments, the decoding resources may further be saved by limiting that the header basic information further includes the minimum point cloud frame index field and the maximum point cloud frame index field, and limiting that the point cloud frame within the point cloud frame index number range references the header information and the point cloud frame within the point cloud frame index number range belongs to the point cloud code stream.

It may be understood that each point cloud frame (sample) corresponds to a unique point cloud frame index number (such as represented by numbers 1, 2, 3, etc.), and the number of the point cloud frames within the point cloud frame index number range may be one or more. That is to say, a field value of the maximum point cloud frame index field is greater than or equal to a field value of the minimum point cloud frame index field. When there are the plurality of point cloud frames in the point cloud frame index number range, the plurality of point cloud frames are point cloud frames with consecutive point cloud frame index numbers.

For example, still taking the point cloud code stream A above as an example, for the point cloud frame A1 to the point cloud frame A100, when the point cloud frame A1 (with a point cloud frame index number of 1) to the point cloud frame A50 (with a point cloud frame index number of 50) both refer to the geometry header information B1, accordingly, in the header basic information corresponding to the geometry header information B1, its minimum point cloud frame index field value is 1, and the maximum point cloud frame index field value is 50.

To support the above operations, illustration is made still by taking GPCCDecoderConfigurationRecord as an example. For ease of understanding, please refer to Table 9, and Table 9 is used for indicating the syntax of the point cloud decoder configuration record structure provided by some embodiments:

TABLE 9

```
aligned(8) class GPCCDecoderConfigurationRecord {
    unsigned int(8)    configurationVersion = 1;
    unsigned int(8)    num_parameter_headers;
    for (i=1; i<=num_parameter_headers; i++) {
        unsigned int(4) header_type;
        unsigned int(8) header_id;
        unsigned int(8) header_length;
        bit(8*header_length) header;
        unsigned int(32) sample_index_min;
        unsigned int(32) sample_index_max;
    }
}
```

The semantics of the syntax shown in Table 9 above are as follows: sample_index_min is the minimum point cloud frame index field, and is used for indicating a minimum value of a sample index number range (i.e., point cloud frame index number range) referencing the current header information. sample_index_max is the maximum point cloud frame index field, and is used for indicating a maximum value of the sample index number range referencing the header information. The semantics of other fields may refer to the relevant descriptions in Table 8 above.

In some embodiments, in the second implementation, the header information referenced by the point cloud frame in a sample group during decoding may be indicated by partitioning them into the SampleGroups. For example, during file encapsulation, the server may partition the point cloud frame in the point cloud code stream into one or more parameter set index sample groups, and add a corresponding reference header information identification field for each parameter set index sample group. The reference header information identification field here may be used for indicating an identifier of the header information referenced by the sample (i.e. the point cloud frame) in the current parameter set index sample group during decoding, and the identifier of each header information is unique. That is to say, the same header information is referenced when decoding the point cloud frame in the same parameter set index sample group, and the header information may be indicated by the reference header information identification field.

In some embodiments, in a case of presence of reusable header information in the point cloud code stream, the point cloud frame in the point cloud code stream is grouped through the corresponding relationship between the point cloud frame in the point cloud code stream and the reusable header information, so as to obtain one or more parameter set index sample groups, and the one or more parameter set index sample groups and the decoder configuration record information are encapsulated as the media file of the immersive media, which can improve encapsulation efficiency of the media file.

It may be understood that the point cloud frames with the same characteristics may belong to the same sample group. Organizing the point cloud frames in a mode of the sample group is equivalent to defining a type of sample groups. Based on this, in some embodiments, the point cloud frames referencing the same header information may be partitioned into the same parameter set index sample group. In this way, all the point cloud frames in the parameter set index sample group need to refer to the header information indicated by their reference header information identification field for corresponding decoding.

For example, still taking the above point cloud code stream A as an example, for the point cloud frame A1 to the point cloud frame A100, when the point cloud frame A1, the point cloud frame A3, the point cloud frame A7, and the point cloud frame A10 all refer to the attribute header information C2, correspondingly, the point cloud frame A1, the point cloud frame A3, the point cloud frame A7, and the point cloud frame A10 may be classified as a parameter set index sample group X, and a value of the reference header information identification field corresponding to the parameter set index sample group X is an identifier of the attribute header information C2.

To support the above operations, here is an example in the form of extending the ISOBMFF data box to describe field extension of some embodiments at a file encapsulation level. It may be understood that some embodiments may define the parameter set index sample group by extending a sample group entry (such as SampleGroupEntry). For ease of understanding, please refer to Table 10, and Table 10 is used for indicating the syntax of a parameter set index sample group structure provided by some embodiments:

TABLE 10 class HeaderRefSampleGroupEntry extend SampleGroupEntry ('aphg'){
  unsigned int(8) header_id;
}

The semantics of the syntax shown in Table 10 above are as follows: header_id is the reference header information identification field, and is used for indicating an identifier of header information referenced by the sample in the parameter set index sample group during decoding. The parameter set index sample group structure shown in Table 10 may also support further optimization and extension, which is not limited in the disclosure.

It may be understood that for one point cloud code stream, one or more parameter set index sample groups may be partitioned to correspond to the different geometry header information. Similarly, one or more parameter set index sample groups may also be partitioned to correspond to the different attribute header information. The parameter set index sample groups partitioned on both sides may be the same or different, which is not limited in some embodiments.

It may be understood that even without using the two modes illustrated above to indicate the corresponding relationship between the point cloud frame and the header information, one point cloud frame may actually contain information corresponding to the certain header information (that is, the point cloud code stream itself may contain the corresponding relationship). In this case, if the parameter set index sample group is not partitioned, in fact, the decoder on the client may first parse all the header information, and then when parsing information on a code stream level of each point cloud frame, parameters in the corresponding header information may also be found for specific decoding. However, the advantage of partitioning the parameter set index sample group is that if there are 10 reusable header information in one point cloud code stream, it is not necessary to parse all the 10 header information at the beginning, but only to parse the currently used header information first. For example, it is assumed that when decoding the first 20 point cloud frames, the 20 point cloud frames all correspond to the header information D1, at this time, only the header information D1 can be parsed first, and the remaining unused header information (such as the header information D2 and the header information D3) may be temporarily left unparsed. That is to say, by partitioning the parameter set index sample group, the decoder can be more finely informed of the header information used for current decoding, so that the decoder can quickly decode the corresponding parameters at the appropriate time point.

Operation S103: Encapsulate the point cloud code stream and the decoder configuration record information as the media file of the immersive media.

It may be known from operation S102 above that in the case of presence of the reusable header information in the point cloud code stream, the server may group the point cloud frame in the point cloud code stream based on the corresponding relationship between the point cloud frame in the point cloud code stream and the reusable header information, so as to obtain the one or more parameter set index sample groups. Each parameter set index sample group here corresponding to one reference header information identification field, and the reference header information identification field may be used for indicating the identifier of the header information referenced during decoding of the point cloud frame in one parameter set index sample group. At this time, the field value of the header information number field in the decoder configuration record information is greater than 1, and the decoder configuration record information contains the plurality of header basic information at the same time. The plurality of header basic information may include header basic information corresponding to the sequence header information and header basic information corresponding to other types of header information (the geometry header information and/or the attribute header information). Further, the one or more parameter set index sample groups and the decoder configuration record information may be encapsulated as the media file for the immersive media.

In some embodiments, in the case of presence of the reusable header information in the point cloud code stream, the server may correspond the different point cloud frames (samples) in the track to the corresponding header information based on the corresponding relationship between the point cloud frame in the point cloud code stream and the reusable header information. Here, the point cloud frames may not be grouped, and finally, the point cloud frame and the decoder configuration record information may be encapsulated as the media file for the immersive media as well.

In some embodiments, in the case of absence of the reusable header information in the point cloud code stream, each point cloud frame contains its own geometry header information and attribute header information. At this time, the field value of the header information number field in the decoder configuration record information is 1, the decoder configuration record information contains one header basic information, and the header basic information is the header basic information corresponding to the sequence header information. Therefore, the server may encapsulate the plurality of point cloud frames containing the header information and the decoder configuration record information as the media file for the immersive media.

In some embodiments, the server may encapsulate the point cloud code stream as the corresponding media file according to a certain encapsulation format (such as AVI and ISOBMFF). It may be understood that the server may encapsulate the point cloud code stream and the decoder configuration record information into one or more tracks, which is not limited here.

It may be understood that the reuse indication information and the decoder configuration record information may provide the header information set used for decoding and the reuse state of the header information set for the point cloud code stream.

Further, after obtaining the media file for the immersive media, the server may transmit the media file to the client. For example, in a streaming media scenario, the server may slice the media file to obtain an initialization segment and a media segment suitable for streaming media transmission. The initialization segment may contain the decoder configuration record information. The number of the initialization segment is usually one, and the number of the media segment is one or more. The number of the media segment is not limited here. Finally, the initialization segment and the media segment may be transmitted to the client through a streaming transmission mode (for example, based on DASH, SMT and other protocols), and subsequent clients may also pull segments that the service object needs to view through the streaming transmission mode.

In some embodiments, by slicing the media file to obtain the initialization segment and the media segment, and transmitting the initialization segment and the media segment to the client through the streaming transmission mode, transmission efficiency of the media file can be improved.

It may be understood that in streaming media transmission, the initialization segment can contain some information used by the client to initialize its decoder, so the decoder configuration record information may be placed in the initialization segment. For example, for the DASH protocol, some embodiments indicates a transport layer constraint, namely, the DASH constraint extension. Each DASH initialization segment shall contain one decoder configuration record information (such as GPCCDecoderConfigurationRecord shown in Table 8 or Table 9 above) to support decoding of the initialization segment and initialization of the decoder.

For another example, in a local playback scenario, the server does not need to slice the media file, but may directly send the entire media file to the client.

It may be known from the above that by distinguishing the reusability of the header information at the code stream level, the decoder of the client may select decoding strategies subsequently according to an actual reuse situation. In the scenario where the header information is reusable, resource waste caused by repeated decoding of the related parameters can be avoided. At the file encapsulation level, the two situations where the header information is reusable and where the header information is nonreusable may be compatible. In the scenario where the header information can be reused, the corresponding relationship between the point cloud frame and the header information may be indicated in more detail by referencing the identifier of the header information, so that the client can decode the corresponding header information at the appropriate time point, and the decoding efficiency may be improved at the same time. That is to say, some embodiments may indicate whether there is reusable header information in the point cloud code stream through the reuse indication information and the decoder configuration record information, thereby avoiding repeated decoding of the same header information and saving the decoding resources.

Some embodiments may encode the point cloud data to obtain the point cloud code stream containing the reuse indication information, the reuse indication information here is determined based on the reuse state of the header information set, and the header information set is generated in the process of encoding the point cloud data. Further, the decoder configuration record information for the point cloud code stream may be generated based on the reuse state, and then the obtained point cloud code stream and decoder configuration record information may be encapsulated as the media file of the immersive media. The reuse indication information and the decoder configuration record information provides the header information set used for decoding and the reuse state of the header information set for the point cloud code stream. It may be seen that some embodiments may indicate whether there is reusable header information in the point cloud code stream through the reuse indication information and the decoder configuration record information, thereby avoiding repeated decoding of the same header information and saving the decoding resources.

Figure 5:
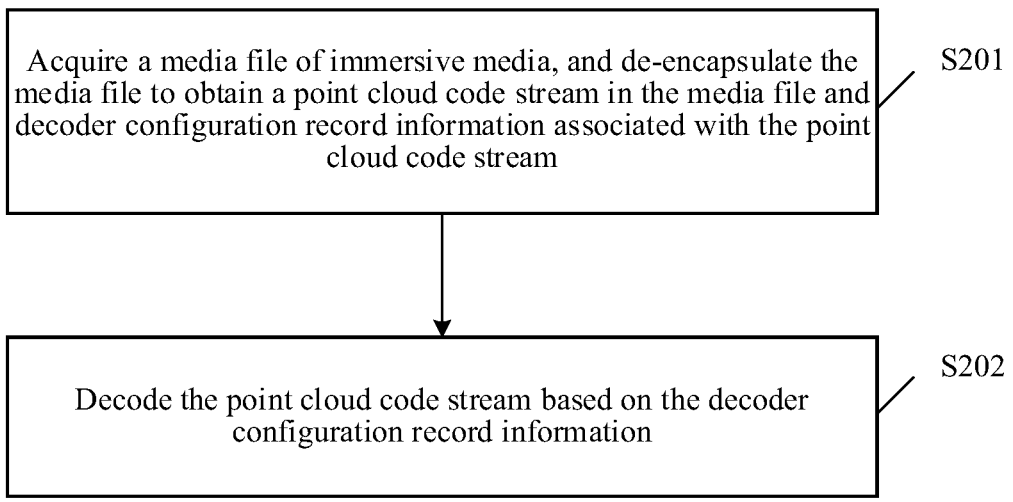
FIG. 5 is a schematic flowchart of a data processing method for immersive media provided by some embodiments.

FIG. 5 is a schematic flowchart of a data processing method for immersive media provided by some embodiments. The method may be executed by a content consumption device (such as the content consumption device 200B in some embodiments corresponding to FIG. 3 above) in an immersive media system. For example, the content consumption device may be a terminal integrated with a client (such as a video client). The method may at least include the following operation S201 to operation S202:

Operation S201: Acquire a media file of the immersive media, and de-encapsulate the media file to obtain a point cloud code stream in the media file and decoder configuration record information associated with the point cloud code stream.

Specifically, the client may acquire the media file of the immersive media sent by a server, and de-encapsulate the media file to obtain the point cloud code stream in the media file and the decoder configuration record information associated with the point cloud code stream. It may be understood that a process of de-encapsulating is opposite to the above encapsulation process. The client may de-encapsulate the media file according to file format requirements used at the time of encapsulation so as to obtain the point cloud code stream. The decoder configuration record information is generated according to the reuse state of the header information set, the header information set is generated in the process of encoding the point cloud data, the point cloud code stream contains the reuse indication information, and the reuse indication information is determined based on the reuse state. In some embodiments, the reuse indication information and the decoder configuration record information may provide the header information set used for decoding and the reuse state of the header information set for the point cloud code stream. A specific process of generating and sending the media file by the server may refer to some embodiments corresponding to FIG. 4 above.

Operation S202: Decode the point cloud code stream based on the decoder configuration record information.

For a scenario where the reuse indication information is added to the sequence header information (which may refer to the description of the first implementation in operation S101 of some embodiments corresponding to FIG. 4 above), the client may determine the reuse state of the header information set based on the header number information field and the header indication information contained by the decoder configuration record information. For example, when the decoder configuration record information only contains header basic information corresponding to the sequence header information, it represents that geometry header information and attribute header information exist in each point cloud frame, and the geometry header information and the attribute header information cannot be reused. For another example, when the decoder configuration record information contains header basic information corresponding to the geometry header information/attribute header information, it represents that the geometry header information/attribute header information may be reused.

Further, in some embodiments, based on the reuse state of the above header information set indicates presence of reusable header information in the point cloud code stream, the client may acquire the reuse indication information from the sequence header information corresponding to the point cloud code stream, the reuse indication information here may include the number of the reusable header information and specific parameters of the header information, and then the point cloud code stream may be decoded based on the header information indicated by the reuse indication information.

In some embodiments, based on the header information indicated by the reuse indication information has been decoded before decoding the point cloud frame in the point cloud code stream, the client may directly acquire the decoded header information and decode the point cloud frame by using the decoded header information. On the contrary, based on the header information indicated by the reuse indication information has not been decoded before decoding the point cloud frame, the client may first decode the header information, and then decode the point cloud frame by using the decoded header information. That is to say, the repeatedly-used header information only needs to be decoded once, and the subsequent point cloud frame may be directly used, thus saving decoding resources and improving decoding efficiency.

In some embodiments, based on the reuse state indicates absence of the reusable header information in the point cloud code stream, the client may decode the point cloud frame based on the header information contained by the point cloud frame in the point cloud code stream.

In some embodiments, the client may decode the header information contained by each point cloud frame in the point cloud code stream to obtain the decoded header information, and then may decode the point cloud frame by using the decoded header information. That is to say, the header information contained by each point cloud frame needs to be decoded. By decoding the header information contained by each point cloud frame in the point cloud code stream to obtain the decoded header information, and decoding the point cloud frame by using the decoded header information, interface efficiency of the point cloud frame may be improved.

In some embodiments, the reuse state of the header information set is determined through the header number information field and the header indication information contained by the decoder configuration record information. Based on the reuse state indicates presence of the reusable header information in the point cloud code stream, the reuse indication information is acquired from the sequence header information corresponding to the point cloud code stream, and the point cloud code stream is decoded directly based on the header information indicated by the reuse indication information. Based on the reuse state indicates absence of the reusable header information in the point cloud code stream, the point cloud frame is decoded directly based on the header information contained by the point cloud frame in the point cloud code stream, thereby improving the interface efficiency of the point cloud frame.

Similarly, for a scenario where the reuse indication information is added to the point cloud frame (which may refer to the description of the second implementation in operation S101 of some embodiments corresponding to FIG. 4 above), the client may determine the reuse state of the header information set based on the header number information field and the header indication information contained by the decoder configuration record information as well.

Further, in some embodiments, based on the reuse state of the above header information set indicating presence of the reusable header information in the point cloud code stream, the client may acquire the reuse indication information from the point cloud frame contained by the point cloud code stream, and then may further decode the point cloud frame based on the header information (such as geometry header information indicated by a reused geometry header identification field, and attribute header information indicated by a reused attribute header identification field, or geometry header information and attribute header information used in a previous frame of a current point cloud frame) indicated by the reuse indication information.

In some embodiments, based on the reuse state indicates absence of the reusable header information in the point cloud code stream, the client may decode the point cloud frame based on the header information contained by the point cloud frame.

In some embodiments, the reuse state of the header information set is determined through the header number information field and the header indication information contained in the decoder configuration record information. Based on the reuse state indicates presence of the reusable header information in the point cloud code stream, the reuse indication information is directly acquired from the point cloud frame contained by the point cloud code stream, and the point cloud frame is decoded based on the header information indicated by the reuse indication information. Based on the reuse state indicating absence of the reusable header information in the point cloud code stream, the point cloud frame is decoded directly based on the header information contained by the point cloud frame, thereby improving decoding efficiency of the point cloud frame.

A decoding process of the point cloud frame in this implementation may refer to the decoding process described in the above implementation.

It may be known from the above that by distinguishing reusability of the header information at a code stream level, a decoder of the client may select decoding strategies according to an actual reuse situation. In a scenario where the header information is reusable, resource waste caused by repeated decoding of related parameters can be avoided. At a file encapsulation level, the two situations where the header information is reusable and where the header information is nonreusable may be compatible. In the scenario where the header information can be reused, a corresponding relationship between the point cloud frame and the header information may be indicated in more detail by referencing an identifier of the header information, so that the client can decode the corresponding header information at an appropriate time point, and the decoding efficiency may be improved at the same time.

Figure 6:
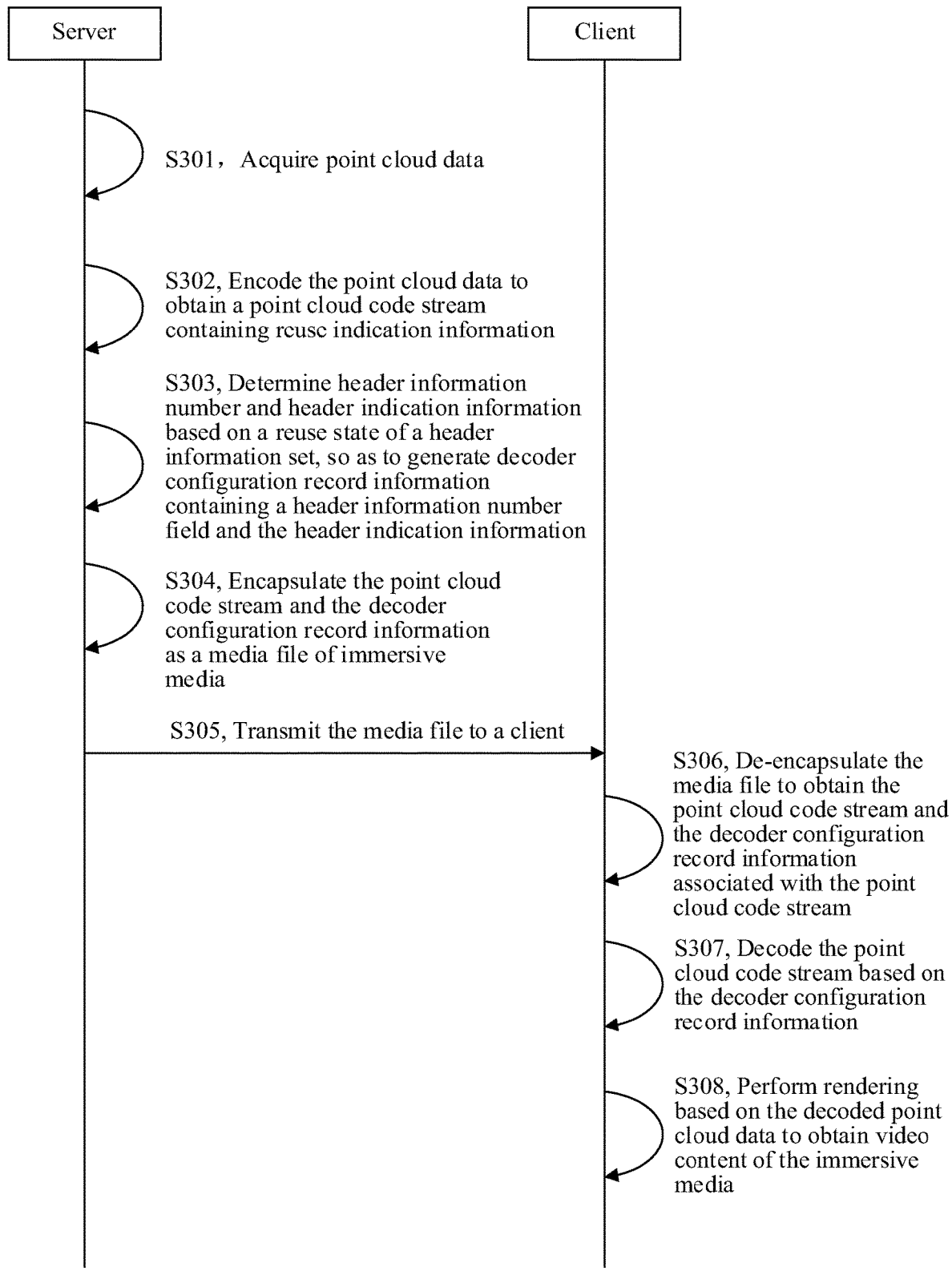
FIG. 6 is a schematic interactive flowchart of a data processing method for immersive media provided by some embodiments.

FIG. 6 is a schematic interactive flowchart of a data processing method for immersive media provided by some embodiments. The method may be executed jointly by a content production device (such as the content production device 200A in some embodiments corresponding to FIG. 3 above) and a content consumption device (such as a content consumption device 200B in some embodiments corresponding to FIG. 3 above) in an immersive media system. For example, the content production device may be a server, and the content consumption device may a terminal integrated with a client (such as a video client). The method may at least include the following operations:

Operation S301: Acquire, by the server, point cloud data.

For a specific implementation process of the operation, reference may be made to operation S101 in some embodiments corresponding to FIG. 4 above.

Operation S302: Encode, by the server, the point cloud data to obtain a point cloud code stream containing reuse indication information.

For a specific implementation process of the operation, reference may be made to operation S101 in some embodiments corresponding to FIG. 4 above.

Operation S303: Determine, by the server, the header information number and header indication information based on a reuse state of a header information set, so as to generate decoder configuration record information containing a header information number field and the header indication information.

For a specific implementation process of the operation, reference may be made to operation S102 in some embodiments corresponding to FIG. 4 above.

Operation S304: Encapsulate, by the server, the point cloud code stream and the decoder configuration record information as a media file of the immersive media.

For a specific implementation process of the operation, reference may be made to operation S103 in some embodiments corresponding to FIG. 4 above.

Operation S305: Transmit, by the server, the media file to the client.

For a specific implementation process of the operation, reference may be made to operation S103 in some embodiments corresponding to FIG. 4 above.

Operation S306: De-encapsulate, by the client, the acquired media file to obtain the point cloud code stream in the media file and decoder configuration record information associated with the point cloud code stream.

For a specific implementation process of the operation, reference may be made to operation S201 in some embodiments corresponding to FIG. 5 above.

Operation S307: Decode, by the client, the point cloud code stream based on the decoder configuration record information.

For a specific implementation process of the operation, reference may be made to operation S202 in some embodiments corresponding to FIG. 5 above.

Operation S308: Perform, by the client, rendering based on the decoded point cloud data to obtain video content of the immersive media.

For ease of understanding, illustration is made below by examples in conjunction of a streaming media scenario and a local playback scenario.

For example, in the streaming media scenario, following processing processes may be mainly included:

(1) In an encoding stage, the server may indicate whether there is reusable header information and the number and specific parameter information (i.e. reuse indication information, and illustration is made here by taking a mode of being added to sequence header information as an example) of these header information according to a reuse situation of geometry header information and attribute header information in the entire point cloud code stream.

a) For example, it is assumed that one point cloud code stream contains 100 point cloud frames, the 0-49 frames in the point cloud code stream refer to geometry header information of header_id=10 and attribute header information of header_id=20, the 50-99 frames refer to geometry header information of header_id=11 and attribute header information of header_id=21, and then the reuse indication information S1:

geometry_header_per_frame=0; //first geometry header reuse state field
attribute_header_per_frame=0; //first attribute header reuse state field
sh_num_geometry_headers=2; geometry header number field
sh_num_attribute_headers=2; attribute header number field b) For example, it is assumed that there is no reusable header information in the point cloud code stream, then the reuse indication information S2:

geometry_header_per_frame=1;
attribute_header_per_frame=1

(2) When the server performs file encapsulation on the point cloud code stream in (1), metadata information (i.e. the decoder configuration record information) related to a decoder configuration may be added according to the reuse situation of the header information.

a) The decoder configuration record information F1:
num_parameter_headers=5; // header information number field
{header_type=0; header_id=0; header_length=120}// are a header information type field, a header information identification field, and a header information length field in sequence.
{header_type=1; header_id=10; header_length=20}
{header_type=1; header_id=11; header_length=20}
{header_type=2; header_id=20; header_length=20}
{header_type=2; header_id=21; header_length=20}
b) The decoder configuration record information F2:
num_parameter_headers=1;
{header_type=0; header_id=100; header_length=20}

(3) If there is the reusable header information in (2), the server may correspond different samples in a file track to the corresponding header information based on a corresponding relationship between the point cloud frame and the header information.

For example, for the decoder configuration record information F1, the samples in the track correspond to a parameter set index sample group (for example, 0-49 frames) referencing to {header_id=10 and header_id=20} header information set and a parameter set index sample group (for example, 50-99 frames) referencing to {header_id=11 and header_id=21} header information set respectively.

(4) The server streams (i.e. slices) the media file (also known as a point cloud file) to obtain a plurality of segments, where an initialization segment contains the decoder configuration record information in (2).

(5) The client requests the streaming media.

a) For a file stream related to the decoder configuration record information F1, it may be known from the decoder configuration record information F1 that the header information set indicated by it contains the plurality of geometry header information and attribute header information, which indicates that the geometry header information and attribute header information may be reused, and thus only need to be decoded once during decoding.

b) For a file stream related to the decoder configuration record information F2, it may be known from the decoder configuration record information F2 that the header information set indicated by it only contains sequence header information, which indicates that the geometry header information and the attribute header information exist in each frame of point cloud frame and cannot be reused, and it is necessary to parse the geometry header information and attribute header information contained by the point cloud frame during decoding of each frame.

For another example, in the local playback scenario, following processing processes may be mainly included:

(1) In the encoding stage, the server may indicate whether there is reusable header information and the number and specific parameter information (i.e. reuse indication information, and illustration is made here by taking a mode of being added to sequence header information as an example) of these header information according to the reuse situation of the geometry header information and attribute header information in the entire point cloud code stream.

a) For example, it is assumed that one point cloud code stream contains 100 point cloud frames, the 0-49 frames in the point cloud code stream refer to geometry header information of header_id=10 and attribute header information of header_id=20, the 50-99 frames refer to geometry header information of header_id=11 and attribute header information of header_id=21, and then the reuse indication information S1:
geometry_header_per_frame=0;
attribute_header_per_frame=0;
sh_num_geometry_headers=2;
sh_num_attribute_headers=2;

b) For example, it is assumed that there is no reusable header information in the point cloud code stream, and then the reuse indication information S2:
geometry_header_per_frame=1;
attribute_header_per_frame=1

(2) When the server performs file encapsulation on the point cloud code stream in (1), the metadata information (i.e. the decoder configuration record information) related to a decoder configuration may be added according to the reuse situation of the header information.

a) The decoder configuration record information F1:
num_parameter_headers=5;
{header_type=0; header_id=0; header_length=120}
{header_type=1; header_id=10; header_length=20}
{header_type=1; header_id=11; header_length=20}
{header_type=2; header_id=20; header_length=20}
{header_type=2; header_id=21; header_length=20}
b) The decoder configuration record information F2:
num_parameter_headers=1;
{header_type=0; header_id=100; header_length=20}

(3) If there is reusable header information in (2), the server may correspond different samples in a file track to the corresponding header information based on a corresponding relationship between the point cloud frame and the header information.

For example, for the decoder configuration record information F1, the samples in the track correspond to a parameter set index sample group (for example, 0-49 frames) referencing to {header_id=10 and header_id=20} header information set and a parameter set index sample group (for example, 50-99 frames) referencing to {header_id=11 and header_id=21} header information set respectively.

(4) The server sends the media file to the client.

(5) The client de-encapsulates and decodes the entire file.

a) For a media file related to the decoder configuration record information F1, it may be known from the decoder configuration record information F1 that the header information set indicated by it contains the plurality of geometry header information and attribute header information, which indicates that the geometry header information and attribute header information may be reused, and thus only need to be decoded once during decoding.

Further, since each sample (i.e. one point cloud frame) corresponds to the {header_id=10 and header_id=20} header information set or {header_id=11 and header_id=21} header information set, the client may accurately parse the corresponding header information when consuming the corresponding point cloud frame.

b) For a media file related to the decoder configuration record information F2, it may be known from the decoder configuration record information F2 that the header information set indicated by it only contains sequence header information, which indicates that the geometry header information and the attribute header information exist in each frame of point cloud frame and cannot be reused, and it is necessary to parse the geometry header information and attribute header information contained by the point cloud frame during decoding of each frame.

It may be known from above that some embodiments may indicate whether there is reusable header information in the point cloud code stream through the reuse indication information and the decoder configuration record information, thereby avoiding repeated decoding of the same header information and saving the decoding resources.

Figure 7:
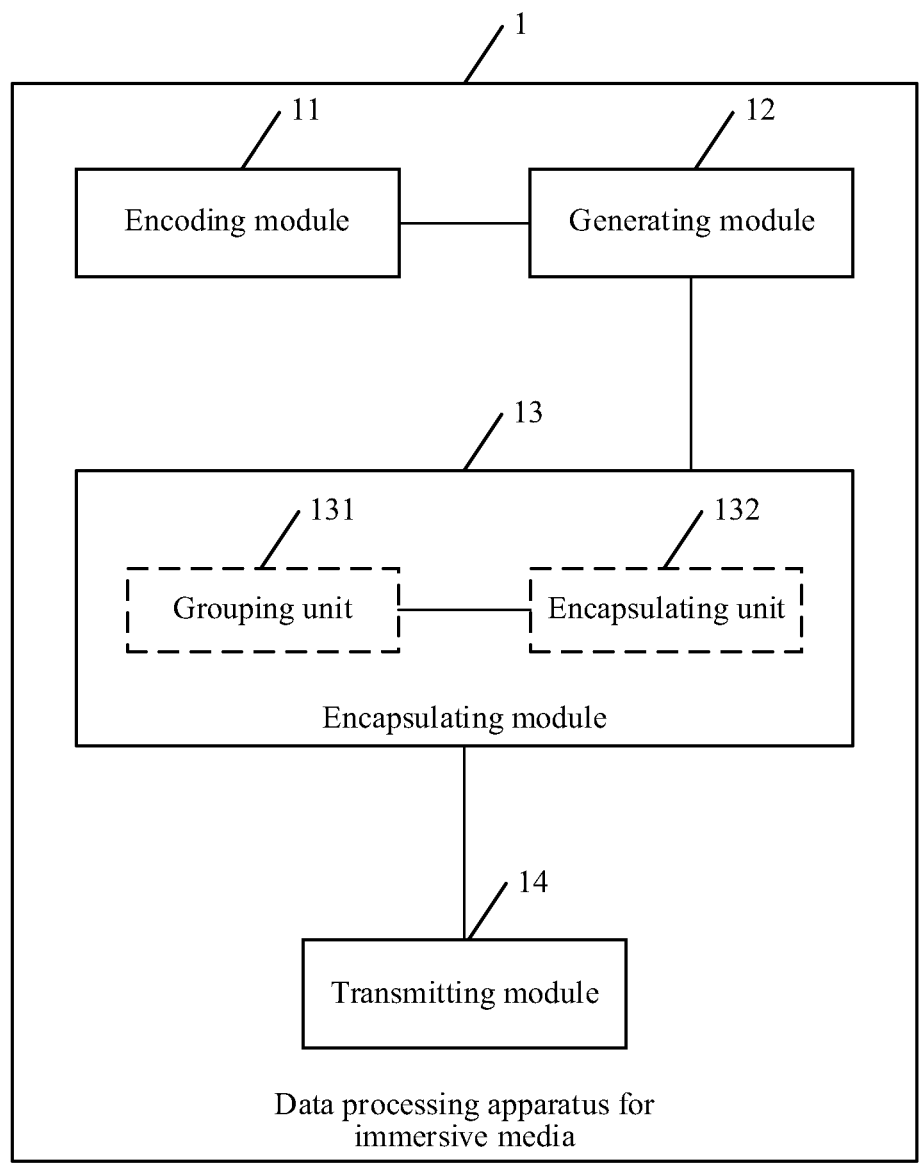
FIG. 7 is a schematic structural diagram of a data processing apparatus for immersive media provided by some embodiments.

Please refer to FIG. 7, and FIG. 7 is a schematic structural diagram of a data processing apparatus for immersive media provided by some embodiments. The data processing apparatus for the immersive media may be a computer readable instruction (including a program code) running on a content production device. For example, the data processing apparatus for the immersive media is one application software in the content production device. The apparatus may be used for executing corresponding operations in the data processing method for the immersive media provided by some embodiments. As shown in FIG. 7, the data processing apparatus 1 for the immersive media may include: an encoding module 11, a generating module 12, an encapsulating module 13, and a transmitting module 14.

The encoding module 11 is configured to acquire point cloud data and encode the point cloud data to obtain a point cloud code stream containing reuse indication information. The reuse indication information is determined based on a reuse state of a header information set, and the header information set is generated in a process of encoding the point cloud data.

In an implementation, the reuse indication information is used for being added to sequence header information corresponding to the point cloud code stream; and the reuse indication information includes a first parameter reuse state field, and the first parameter reuse state field is used for indicating the reuse state of the header information set.

In an implementation, the header information set includes geometry header information; the first parameter reuse state field includes a first geometry header reuse state field, and the first geometry header reuse state field is used for indicating a reuse state of the geometry header information in the point cloud code stream; based on a field value of the first geometry header reuse state field is a first state value, it represents presence of reusable geometry header information in the point cloud code stream; and based on the field value of the first geometry header reuse state field is a second state value, it represents absence of the reusable geometry header information in the point cloud code stream.

In an implementation, based on the field value of the first geometry header reuse state field is the first state value, it represents that each point cloud frame in the point cloud code stream does not contain the geometry header information, and the reuse indication information further includes a geometry header number field and geometry header indication information; the geometry header number field is used for indicating the number of the reusable geometry header information in the point cloud code stream, a field value of the geometry header number field is M, and M is a positive integer; the geometry header indication information includes M reusable geometry header information; and the first geometry header reuse state field with the first state value is further used for indicating to respectively reference one of the M reusable geometry header information when a client decodes each point cloud frame in the point cloud code stream.

In an implementation, based on the field value of the first geometry header reuse state field is the second state value, it represents that each point cloud frame in the point cloud code stream contains one geometry header information; and the first geometry header reuse state field with the second state value is further used for indicating to respectively reference the geometry header information contained by each point cloud frame when the client decodes each point cloud frame in the point cloud code stream.

In an implementation, the header information set includes the attribute header information; the first parameter reuse state field includes a first attribute header reuse state field, and the first attribute header reuse state field is used for indicating a reuse state of the attribute header information in the point cloud code stream; based on a field value of the first attribute header reuse state field is a third state value, it represents presence of reusable attribute header information in the point cloud code stream; and based on the field value of the first attribute header reuse state field is a fourth state value, it represents absence of the reusable attribute header information in the point cloud code stream.

In an implementation, based on the field value of the first attribute header reuse state field is the third state value, it represents that each point cloud frame in the point cloud code stream does not contain the attribute header information, and the reuse indication information further includes an attribute header number field and attribute header indication information; the attribute header number field is used for indicating the number of the reusable attribute header information in the point cloud code stream, a field value of the attribute header number field is N, and N is a positive integer; the attribute header indication information includes N reusable attribute header information; and the first attribute header reuse state field with the third state value is further used for indicating to respectively reference one or more attribute header information among the N reusable attribute header information when the client decodes each point cloud frame in the point cloud code stream.

In an implementation, based on the field value of the first attribute header reuse state field is the fourth state value, it represents that each point cloud frame in the point cloud code stream contains one or more attribute header information; and the first attribute header reuse state field with the fourth state value is further used for indicating to respectively reference the attribute header information contained by each point cloud frame when the client decodes each point cloud frame in the point cloud code stream.

In an implementation, the reuse indication information is used for being added to the point cloud frame contained in the point cloud code stream; the point cloud code stream includes the plurality of point cloud frames, and the plurality of point cloud frames include a target point cloud frame; and reuse indication information in the target point cloud frame includes a second parameter reuse state field, and the second parameter reuse state field is used for indicating a reuse state of the header information set referenced by decoding the target point cloud frame. In an implementation, the plurality of point cloud frames further include a first historical point cloud frame, and a generation timestamp of the first historical point cloud frame is earlier than a generation timestamp of the target point cloud frame; the first historical point cloud frame is a previous frame of the target point cloud frame; the header information set includes the geometry header information; the second parameter reuse state field includes a second geometry header reuse state field, and the second geometry header reuse state field is used for indicating a reuse state of geometry header information referenced by decoding the target point cloud frame; and based on a field value of the second geometry header reuse state field is a fifth state value, it represents that geometry header information referenced by the first historical point cloud frame is repeatedly used during decoding of the target point cloud frame.

In an implementation, the plurality of point cloud frames further include a second historical point cloud frame, and a generation timestamp of the second historical point cloud frame is earlier than a generation timestamp of the target point cloud frame; the header information set includes the geometry header information; the second parameter reuse state field includes a second geometry header reuse state field, and the second geometry header reuse state field is used for indicating a reuse state of geometry header information referenced by decoding the target point cloud frame; and based on a field value of the second geometry header reuse state field is a fifth state value, the reuse indication information in the target point cloud frame further includes a reused geometry header identification field, and the second geometry header reuse state field with the fifth state value is used for indicating to reference geometry header information indicated by the reused geometry header identification field during decoding of the target point cloud frame; and the geometry header information indicated by the reused geometry header identification field is the geometry header information referenced by the second historical point cloud frame. In an implementation, based on the field value of the second geometry header reuse state field is a sixth state value, it represents that the target point cloud frame contains the geometry header information, and the second geometry header reuse state field with the sixth state value is further used for indicating to reference the geometry header information contained by the target point cloud frame during decoding of the target point cloud frame. In an implementation, the plurality of point cloud frames further include a third historical point cloud frame, and a generation timestamp of the third historical point cloud frame is earlier than a generation timestamp of the target point cloud frame; the third historical point cloud frame is a previous frame of the target point cloud frame; the header information set includes the attribute header information; the second parameter reuse state field includes a second attribute header reuse state field, and the second attribute header reuse state field is used for indicating a reuse state of attribute header information referenced by decoding the target point cloud frame; and based on a field value of the second attribute header reuse state field is a seventh state value, it represents that attribute header information referenced by the third historical point cloud frame is repeatedly used during decoding of the target point cloud frame. In an implementation, the plurality of point cloud frames further include a fourth historical point cloud frame, and a generation timestamp of the fourth historical point cloud frame is earlier than a generation timestamp of the target point cloud frame; the header information set includes the attribute header information; the second parameter reuse state field includes a second attribute header reuse state field, and the second attribute header reuse state field is used for indicating a reuse state of attribute header information referenced by decoding the target point cloud frame; and based on a field value of the second attribute header reuse state field is a seventh state value, the reuse indication information in the target point cloud frame further includes a reused attribute header identification field, and the second attribute header reuse state field with the seventh state value is used for indicating to reference attribute header information indicated by the reused attribute header identification field during decoding of the target point cloud frame; and the attribute header information indicated by the reused attribute header identification field is the attribute header information referenced by the fourth historical point cloud frame. In an implementation, based on the field value of the second attribute header reuse state field is an eighth state value, it represents that the target point cloud frame contains the attribute header information; and the second attribute header reuse state field with the eighth state value is further used for indicating to reference the attribute header information contained by the target point cloud frame when the client decodes the target point cloud frame. The generating module 12 is configured to generate decoder configuration record information for the point cloud code stream according to the reuse state; and the above generating module 12 is specifically configured to determine the header information number and header indication information based on the reuse state, and generate the decoder configuration record information containing a header information number field and the header indication information; the header information number field is used for indicating the number of header information referenced for decoding the point cloud code stream; a field value of the header information number field is K, and K is a positive integer; and the header indication information includes K header basic information.

In an implementation, each header basic information contains a header information type field, a header information identification field, a header information length field, and a header information description field; the header information type field is used for indicating a type of $i^{th}$ header information among the K header information, and i is a positive integer less than or equal to K; the header information identification field is used for indicating an identifier of the $i^{th}$ header information; the header information length field is used for indicating a length of the $i^{th}$ header information; and the header information description field is used for indicating the $i^{th}$ header information.

In an implementation, based on a field value of the header information type field is a first type field value, it represents that the $i^{th}$ header information is sequence header information; based on the field value of the header information type field is a second type field value, it represents that the $i^{th}$ header information is geometry header information; and based on the field value of the header information type field is a third type field value, it represents that the $i^{th}$ header information is attribute header information.

In an implementation, each header basic information further includes a minimum point cloud frame index field and a maximum point cloud frame index field; the minimum point cloud frame index field is used for indicating a minimum value of a point cloud frame index number range referencing the $i^{th}$ header information; the maximum point cloud frame index field is used for indicating a maximum value of the point cloud frame index number range referencing the $i^{th}$ header information; and point cloud frames within the point cloud frame index number range all refer to the $i^{th}$ header information, and the point cloud frames within the point cloud frame index number range belong to the point cloud code stream.

The encapsulating module 13 is configured to encapsulate the point cloud code stream and the decoder configuration record information as a media file of the immersive media; and the reuse indication information and the decoder configuration record information are used for providing the header information set used for decoding and the reuse state of the header information set for the point cloud code stream in the media file.

The encapsulating module 13 may include: a grouping unit 131 and an encapsulating unit 132.

The grouping unit 131 is configured to group, in a case of presence of reusable header information in the point cloud code stream, a point cloud frame in the point cloud code stream based on a corresponding relationship between the point cloud frame in the point cloud code stream and the reusable header information, so as to obtain one or more parameter set index sample groups. Each parameter set index sample group corresponds to one reference header information identification field, and the reference header information identification field is used for indicating an identifier of header information referenced during decoding of the point cloud frame in one parameter set index sample group.

The encapsulating unit 132 is configured to encapsulate the one or more parameter set index sample groups and the decoder configuration record information as a media file of the immersive media.

For the specific implementation of the grouping unit 131 and the encapsulating unit 132, reference may be made to operation S103 in some embodiments corresponding to FIG. 4 above.

The transmitting module 14 is configured to slice the media file to obtain an initialization segment and a media segment, the initialization segment containing the decoder configuration record information; and transmit the initialization segment and the media segment to the client through a streaming transmission mode.

For specific implementation of the encoding module 11, the generating module 12, the encapsulating module 13, and the transmitting module 14, reference may be made to operation S101 to operation S103 in some embodiments corresponding to FIG. 4 above. In addition, the beneficial effects of using the same method are described.

Figure 8:
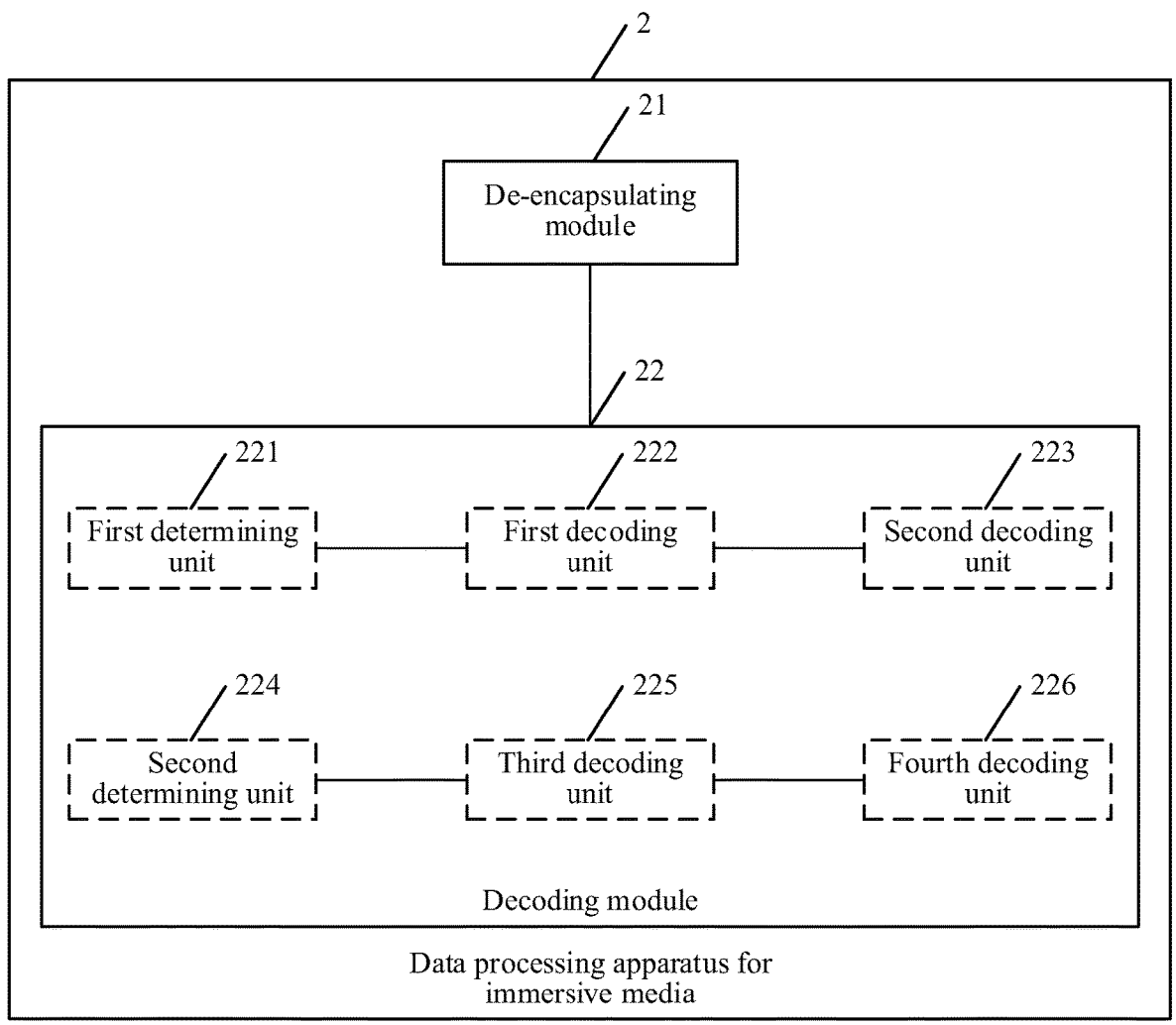
FIG. 8 is a schematic structural diagram of a data processing apparatus for immersive media provided by some embodiments.

FIG. 8 is a schematic structural diagram of a data processing apparatus for immersive media provided by some embodiments. The data processing apparatus for the immersive media may be a computer readable instruction (including a program code) running on a content consumption device. For example, the data processing apparatus for the immersive media is one application software in the content consumption device (such as a video client). The apparatus may be used for executing corresponding operations in the data processing method for the immersive media provided by some embodiments. As shown in FIG. 8, the data processing apparatus 2 for the immersive media may include: a de-encapsulating module 21 and a decoding module 22.

The de-encapsulating module 21 is configured to acquire a media file of the immersive media, and de-encapsulate the media file to obtain a point cloud code stream in the media file and decoder configuration record information associated with the point cloud code stream. The decoder configuration record information is generated according to a reuse state of a header information set, the header information set is generated in a process of encoding point cloud data, the point cloud code stream contains reuse indication information, and the reuse indication information is determined based on the reuse state. The reuse indication information and the decoder configuration record information are used for providing the header information set used for decoding and the reuse state of the header information set for the point cloud code stream.

The decoding module 22 is configured to decode the point cloud code stream based on the decoder configuration record information.

The decoding module 22 may include: a first determining unit 221, a first decoding unit 222, a second decoding unit 223, a second determining unit 224, a third decoding unit 225 and a fourth decoding unit 226.

The first determining unit 221 is configured to determine the reuse state of the header information set based on a header number information field and header indication information contained in the decoder configuration record information.

The first decoding unit 222 is configured to acquire, based on the reuse state indicates presence of reusable header information in the point cloud code stream, the reuse indication information from sequence header information corresponding to the point cloud code stream, and decode the point cloud code stream based on header information indicated by the reuse indication information.

The above first decoding unit 222 is specifically configured to acquire, based on the header information indicated by the reuse indication information has been decoded before decoding the point cloud frame in the point cloud code stream, the decoded header information and decode the point cloud frame by using the decoded header information.

The second decoding unit 223 is configured to decode, based on the reuse state indicates absence of the reusable header information in the point cloud code stream, a point cloud frame based on the header information contained by the point cloud frame in the point cloud code stream.

The above second decoding unit 223 is specifically configured to decode the header information contained by the point cloud frame in the point cloud code stream to obtain the decoded header information, and decode the point cloud frame by using the decoded header information.

The second determining unit 224 is configured to determine the reuse state of the header information set based on the header number information field and the header indication information contained in the decoder configuration record information.

The third decoding unit 225 is configured to acquire, based on the reuse state indicates presence of reusable header information in the point cloud code stream, the reuse indication information from the point cloud frame contained in the point cloud code stream, and decode the point cloud frame based on the header information indicated by the reuse indication information.

The fourth decoding unit 226 is configured to decode, based on the reuse state indicates absence of the reusable header information in the point cloud code stream, the point cloud frame based on the header information contained by the point cloud frame.

For specific implementation of the first determining unit 221, the first decoding unit 222, the second decoding unit 223, the second determining unit 224, the third decoding unit 225 and the fourth decoding unit 226, reference may be made to operation S202 in some embodiments corresponding to FIG. 5 above.

For the specific implementation of the de-encapsulating module 21 and the decoding module 22, reference may be made to operation S201 to operation S202 in some embodiments corresponding to FIG. 5 above. In addition, the beneficial effects of using the same method are described.

Figure 9:
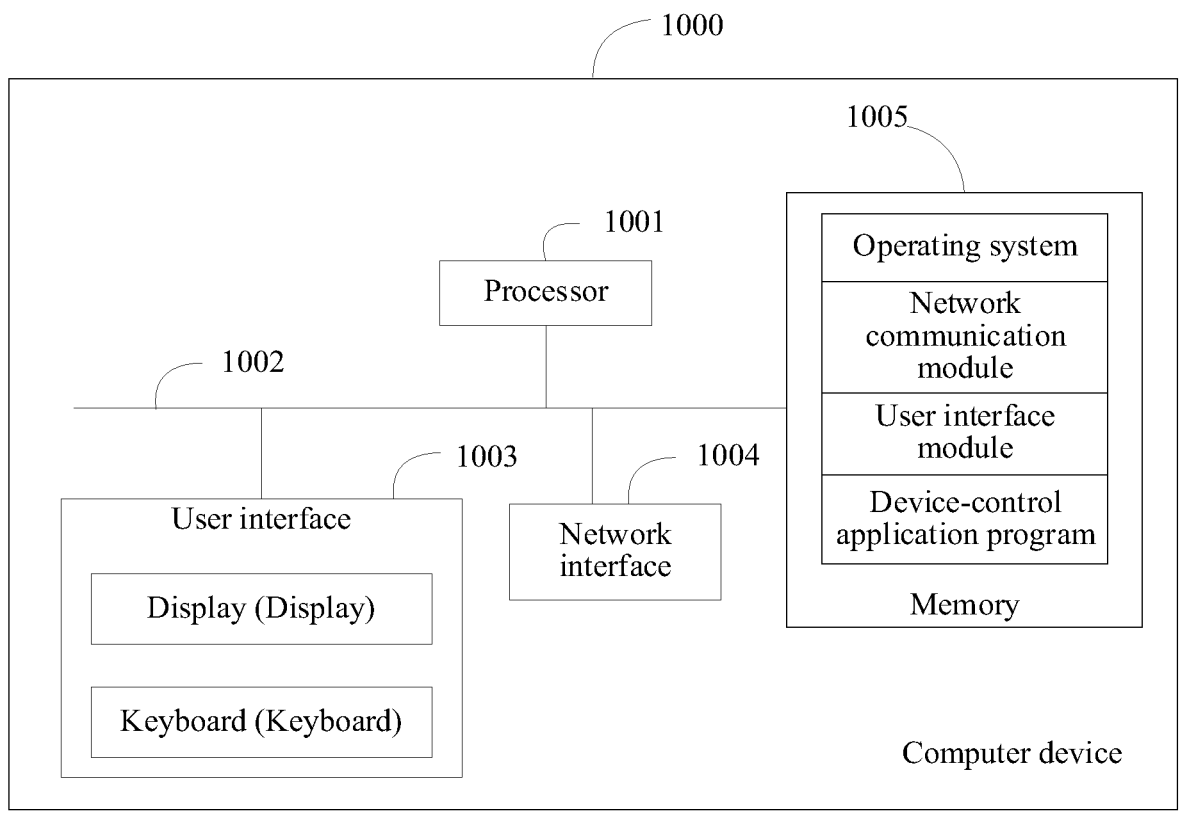
FIG. 9 is a schematic structural diagram of a computer device provided by some embodiments.

FIG. 9 is a schematic structural diagram of a computer device provided by some embodiments. As shown in FIG. 9, the computer device 1000 may include: a processor 1001, a network interface 1004, and a memory 1005. In addition, the above computer device 1000 may further include: a user interface 1003, and at least one communication bus 1002. The communications bus 1002 is configured to implement connection and communication between these components. The user interface 1003 may include a display and a keyboard. In some embodiments, the user interface 1003 may further include a standard wired interface and wireless interface. The network interface 1004 may in some embodiments include a standard wired interface and wireless interface (such as a WI-FI interface). The memory 1005 may be a high-speed RAM, or may be a non-volatile memory, for example, at least one magnetic disk memory. In some embodiments, the memory 1005 may further be at least one storage apparatus that is located far away from the foregoing processor 1001. As shown in FIG. 9, the memory 1005 used as a computer readable storage medium may include an operating system, a network communication module, a user interface module, and a device-control application program.

In the computer device 1000 shown in FIG. 9, the network interface 1004 may provide a network communication function. The user interface 1003 is mainly used for providing an input interface for a user. The processor 1001 may be used for calling the device-control application program stored in the memory 1005 to execute the description of the data processing method for the immersive media in any corresponding embodiment of FIG. 4, FIG. 5, and FIG. 6, which is not repeated here. In addition, the beneficial effects of using the same method are described.

In addition, some embodiments further provides a computer readable storage medium, the computer readable storage medium stores a computer readable instruction executed by the data processing apparatus 1 for the immersive media and the data processing apparatus 2 for the immersive media mentioned above, and the computer readable instruction includes a program instruction. A processor, when executing the program instruction, can execute the description of the data processing method for the immersive media in some embodiments corresponding to any of FIG. 4, FIG. 5 and FIG. 6 above, which is not repeated here. In addition, the beneficial effects of using the same method are described. For technical details that are not disclosed in the computer readable storage medium embodiments involved in the disclosure, reference is made to the descriptions of the method embodiments.

The computer readable storage medium above may be the data processing apparatus for the immersive media provided in any of the aforementioned embodiments, or an internal storage unit of a computer device above, such as a hard disk or internal memory of the computer device. The computer readable storage medium may also be an external storage device of the computer device, such as a plug-in hard disk, a smart media card (SMC), a secure digital (SD) card, a flash card, etc. equipped on the computer device. Further, the computer readable storage medium may further include both the internal storage unit of the computer device and the external storage device. The computer readable storage medium is used for storing the computer readable instruction and other programs and data used by the computer device. The computer readable storage medium may further be used for temporarily storing data that has been or will be outputted.

In addition, some embodiments further provides a computer program product, the computer program product includes a computer readable instruction, and the computer readable instruction is stored in a computer readable storage medium. One or more processors of the computer device read the computer readable instruction from the computer readable storage medium, and the one or more processors execute the computer readable instruction, such that the computer device executes the method provided by some embodiments corresponding to any of FIG. 4, FIG. 5 and FIG. 6. In addition, the beneficial effects of using the same method are described. For technical details that are not disclosed in the computer program product embodiments involved in the disclosure, reference is made to the descriptions of the method embodiments.

Figure 10:
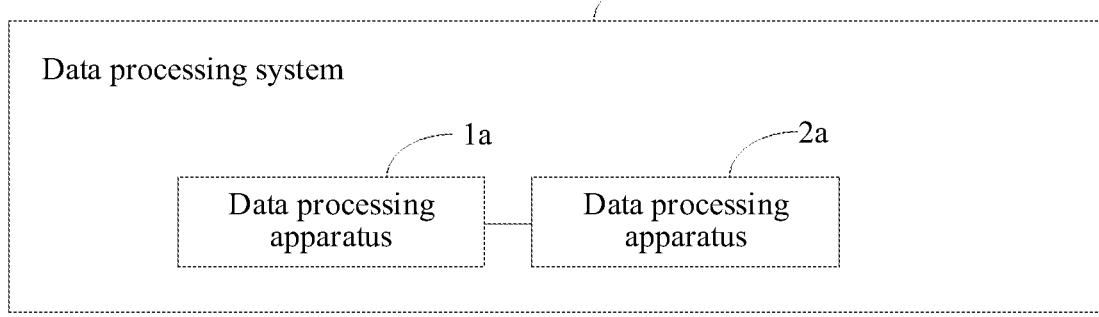
FIG. 10 is a schematic structural diagram of a data processing system provided by some embodiments.

Further, please refer to FIG. 10, and FIG. 10 is a schematic structural diagram of a data processing system provided by some embodiments. The data processing system 3 may contain a data processing apparatus 1*a* and a data processing apparatus 2*a*. The data processing apparatus 1*a* may be the data processing apparatus 1 for the immersive media in some embodiments corresponding to FIG. 7 above. It may be understood that the data processing apparatus 1*a* may be integrated into a content production device 200A in some embodiments corresponding to FIG. 3 above, which is therefore not repeated here. The data processing apparatus 2*a* may be the data processing apparatus 2 for the immersive media in some embodiments corresponding to FIG. 8 above. It may be understood that the data processing apparatus 2*a* may be integrated into a content consumption device 200B in some embodiments corresponding to FIG. 3 above, which is therefore not repeated here. In addition, the beneficial effects of using the same method are described. For technical details that are not disclosed in the data processing system embodiments involved in the disclosure, reference is made to the descriptions of the method embodiments.

Terms such as "first" and "second" in the specification, claims, and the accompanying drawings of some embodiments are used for distinguishing different objects and are not used for describing a specific sequence. In addition, the terms "include" and any variations thereof are intended to cover a non-exclusive inclusion. For example, a process, method, apparatus, product or device that includes a series of operations or units is not limited to the listed operations or modules; and instead, further in some embodiments includes a operation or module that is not listed, or further in some embodiments includes other operation units that are intrinsic to the process, method, apparatus, product or device.

Those ordinarily skilled in the art may realize that, units and algorithm operations of the examples described in the disclosed embodiments herein can be implemented by electronic hardware, computer software, or a combination thereof. To clearly describe the interchangeability between the hardware and the software, the above specification has generally described compositions and operations of each example according to functions. Whether these functions are executed in a mode of hardware or software depends on particular applications and design constraint conditions of the technical solutions. Professional technicians may use different methods to implement the described functions for each particular application, but such implementation is not to be regarded beyond the scope.

What is disclosed above is merely exemplary embodiments, and certainly is not intended to limit the scope of the claims. Therefore, equivalent variations made in accordance with the claims still fall within the scope.

What is claimed is:

1. A data processing method for immersive media, executed by a content production device, the data processing method comprising:
   acquiring point cloud data;
   encoding the point cloud data to obtain a point cloud code stream and a header information set;
   determining reuse indication information of the point cloud code stream based on a reuse state of the header information set;
   generating decoder configuration record information for the point cloud code stream according to the reuse state; and encapsulating the point cloud code stream and the decoder configuration record information as a media file of the immersive media.

2. The method according to claim 1, wherein the reuse indication information is added to sequence header information corresponding to the point cloud code stream; and wherein the reuse indication information comprises a first parameter reuse state field that indicates the reuse state of the header information set.

3. The method according to claim 2, wherein:
the header information set comprises geometry header information;
the first parameter reuse state field comprises a first geometry header reuse state field that indicates a reuse state of the geometry header information in the point cloud code stream; and
based on a field value of the first geometry header reuse state field being a first state value, the field value represents presence of reusable geometry header information in the point cloud code stream; and based on the field value of the first geometry header reuse state field being a second state value, the field value represents absence of the reusable geometry header information in the point cloud code stream.

4. The method according to claim 2, wherein:
the header information set comprises attribute header information;
the first parameter reuse state field comprises a first attribute header reuse state field that indicates a reuse state of the attribute header information in the point cloud code stream;
based on a field value of the first attribute header reuse state field being a third state value, the field value represents presence of reusable attribute header information in the point cloud code stream; and
based on the field value of the first attribute header reuse state field being a fourth state value, the field value represents absence of the reusable attribute header information in the point cloud code stream.

5. The method according to claim 1, wherein:
the reuse indication information is added to a point cloud frame contained in the point cloud code stream;
the point cloud code stream comprises the plurality of point cloud frames, and the plurality of point cloud frames comprise a target point cloud frame; and
reuse indication information in the target point cloud frame comprises a second parameter reuse state field that indicates a reuse state of the header information set referenced by decoding the target point cloud frame.

6. The method according to claim 5, wherein:
the plurality of point cloud frames further comprise a first historical point cloud frame, wherein a generation timestamp of the first historical point cloud frame is earlier than a generation timestamp of the target point cloud frame, and wherein the first historical point cloud frame is a previous frame of the target point cloud frame;
the header information set comprises geometry header information;
the second parameter reuse state field comprises a second geometry header reuse state field that indicates a reuse state of geometry header information referenced by decoding the target point cloud frame; and
based on a field value of the second geometry header reuse state field being a fifth state value, the field value represents that geometry header information referenced by the first historical point cloud frame is repeatedly used during decoding of the target point cloud frame.

7. The method according to claim 5, wherein the plurality of point cloud frames further comprise a second historical point cloud frame, wherein a generation timestamp of the second historical point cloud frame is earlier than a generation timestamp of the target point cloud frame;
the header information set comprises geometry header information;
the second parameter reuse state field comprises a second geometry header reuse state field that indicates a reuse state of geometry header information referenced by decoding the target point cloud frame; and
based on a field value of the second geometry header reuse state field being a fifth state value, the reuse state field indicates reference geometry header information indicated by the reused geometry header identification field during decoding of the target point cloud frame, the reuse indication information in the target point cloud frame further comprises a reused geometry header identification field, and the geometry header information indicated by the reused geometry header identification field is the geometry header information referenced by the second historical point cloud frame.

8. The method according to claim 1, wherein the generating comprises:
determining the header information number and header indication information based on the reuse state, and generating the decoder configuration record information containing a header information number field corresponding to the header information number and the header indication information, wherein the header information number field is used for indicating the number of header information referenced for decoding the point cloud code stream, a field value of the header information number field is K, and K is a positive integer, and the header indication information comprises K header basic information.

9. The method according to claim 8, wherein:
each header basic information contains a header information type field, a header information identification field, a header information length field, and a header information description field;
the header information type field indicates a type of $i^{th}$ header information among the K header information, where i is a positive integer less than or equal to K;
the header information identification field indicates an identifier of the $i^{th}$ header information;
the header information length field indicates a length of the $i^{th}$ header information; and
the header information description field indicates the $i^{th}$ header information.

10. The method according to claim 1, wherein the encapsulating comprises:
grouping, in a case of presence of reusable header information in the point cloud code stream, a point cloud frame in the point cloud code stream based on a corresponding relationship between the point cloud frame in the point cloud code stream and the reusable header information, so as to obtain one or more parameter set index sample groups, each parameter set index sample group corresponding to one reference header information identification field, wherein the reference header information identification field indicates an identifier of header information referenced during decoding of the point cloud frame in the corresponding parameter set index sample group; and encapsulating the one or more parameter set index sample groups and the decoder configuration record information as a media file of the immersive media.

11. A data processing apparatus comprising:
at least one memory storing computer program code; and
at least one processor configured to access the at least one memory and operate according to the computer program code, the computer program code comprising:
acquiring code configured to cause at least one of the at least one processor to acquire point cloud data;
encoding code configured to cause at least one of the at least one processor to encode the point cloud data to obtain a point cloud code stream and generate a header information set;
determining code configured to cause at least one of the at least one processor to determine reuse indication information of the point cloud code stream based on a reuse state of the header information set;
generating code configured to cause at least one of the at least one processor to generate decoder configuration record information for the point cloud code stream according to the reuse state; and
encapsulating code configured to cause at least one of the at least one processor to encapsulate the point cloud code stream and the decoder configuration record information as a media file of the immersive media.

12. The apparatus according to claim 11, wherein the reuse indication information is added to sequence header information corresponding to the point cloud code stream; and wherein the reuse indication information comprises a first parameter reuse state field that indicates the reuse state of the header information set.

13. The apparatus according to claim 12, wherein:
the header information set comprises geometry header information;
the first parameter reuse state field comprises a first geometry header reuse state field that indicates a reuse state of the geometry header information in the point cloud code stream; and
based on a field value of the first geometry header reuse state field being a first state value, the field value represents presence of reusable geometry header information in the point cloud code stream; and based on the field value of the first geometry header reuse state field being a second state value, the field value represents absence of the reusable geometry header information in the point cloud code stream.

14. The apparatus according to claim 12, wherein:
the header information set comprises attribute header information;
the first parameter reuse state field comprises a first attribute header reuse state field that indicates a reuse state of the attribute header information in the point cloud code stream;
based on a field value of the first attribute header reuse state field being a third state value, the field value represents presence of reusable attribute header information in the point cloud code stream; and
based on the field value of the first attribute header reuse state field being a fourth state value, the field value represents absence of the reusable attribute header information in the point cloud code stream.

15. The apparatus according to claim 11, wherein:
the reuse indication information is added to a point cloud frame contained in the point cloud code stream; the point cloud code stream comprises the plurality of point cloud frames, and the plurality of point cloud frames comprise a target point cloud frame; and
reuse indication information in the target point cloud frame comprises a second parameter reuse state field that indicates a reuse state of the header information set referenced by decoding the target point cloud frame.

16. The apparatus according to claim 15, wherein:
the plurality of point cloud frames further comprise a first historical point cloud frame, wherein a generation timestamp of the first historical point cloud frame is earlier than a generation timestamp of the target point cloud frame, and wherein the first historical point cloud frame is a previous frame of the target point cloud frame;
the header information set comprises geometry header information;
the second parameter reuse state field comprises a second geometry header reuse state field that indicates a reuse state of geometry header information referenced by decoding the target point cloud frame; and
based on a field value of the second geometry header reuse state field being a fifth state value, the field value represents that geometry header information referenced by the first historical point cloud frame is repeatedly used during decoding of the target point cloud frame.

17. The apparatus according to claim 5, wherein the plurality of point cloud frames further comprise a second historical point cloud frame, wherein a generation timestamp of the second historical point cloud frame is earlier than a generation timestamp of the target point cloud frame;
the header information set comprises geometry header information;
the second parameter reuse state field comprises a second geometry header reuse state field that indicates a reuse state of geometry header information referenced by decoding the target point cloud frame; and
based on a field value of the second geometry header reuse state field being a fifth state value, the reuse state field indicates reference geometry header information indicated by the reused geometry header identification field during decoding of the target point cloud frame, the reuse indication information in the target point cloud frame further comprises a reused geometry header identification field, and the geometry header information indicated by the reused geometry header identification field is the geometry header information referenced by the second historical point cloud frame.

18. The apparatus according to claim 11, wherein:
each header basic information contains a header information type field, a header information identification field, a header information length field, and a header information description field;
the header information type field indicates a type of $i^{th}$ header information among the K header information, where i is a positive integer less than or equal to K;
the header information identification field indicates an identifier of the $i^{th}$ header information;
the header information length field indicates a length of the $i^{th}$ header information;
the header information description field indicates the $i^{th}$ header information; and
wherein the generating code is further configured to:
determine the header information number and header indication information based on the reuse state, and generating the decoder configuration record information containing a header information number field corresponding to the header information number and the header indication information, wherein the header information number field is used for indicating the number of header information referenced for decoding the point cloud code stream, a field value of the header information number field is K, and K is a positive integer, and the header indication information comprises K header basic information.

19. The apparatus according to claim 11, wherein the encapsulating code is further configured to:
grouping, in a case of presence of reusable header information in the point cloud code stream, a point cloud frame in the point cloud code stream based on a corresponding relationship between the point cloud frame in the point cloud code stream and the reusable header information, so as to obtain one or more parameter set index sample groups, each parameter set index sample group corresponding to one reference header information identification field, wherein the reference header information identification field indicates an identifier of header information referenced during decoding of the point cloud frame in the corresponding parameter set index sample group; and
encapsulating the one or more parameter set index sample groups and the decoder configuration record information as a media file of the immersive media.

20. A non-transitory computer-readable medium that stores data processing storing program code which, when executed by at least one processor, causes the at least one processor to at least:
acquire point cloud data;
encode the point cloud data to obtain a point cloud code stream and generate a header information set;
determine reuse indication information of the point cloud code stream based on a reuse state of the header information set;
generate decoder configuration record information for the point cloud code stream according to the reuse state; and
encapsulate the point cloud code stream and the decoder configuration record information as a media file of the immersive media.

* * * * *